(12) United States Patent
Maekawa

(10) Patent No.: US 7,835,244 B2
(45) Date of Patent: Nov. 16, 2010

(54) OPTICAL DISC APPARATUS AND ADIP DECODER

(75) Inventor: Tomoyuki Maekawa, Fujisawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 475 days.

(21) Appl. No.: 12/019,023

(22) Filed: Jan. 24, 2008

(65) Prior Publication Data

US 2008/0181078 A1 Jul. 31, 2008

(30) Foreign Application Priority Data

Jan. 26, 2007 (JP) ............... 2007-016674

(51) Int. Cl.
*G11B 7/00* (2006.01)
(52) U.S. Cl. ............... 369/59.19; 369/47.21; 369/59.21
(58) Field of Classification Search ............ 369/59.19, 369/47.21
See application file for complete search history.

(56) References Cited

U.S. PATENT DOCUMENTS 7,065,017 B2 6/2006 Nishida
2004/0130995 A1 7/2004 Nakajima et al.

FOREIGN PATENT DOCUMENTS

JP 2004-103184 4/2004

*Primary Examiner*—Jorge L Ortiz Criado
(74) *Attorney, Agent, or Firm*—Turocy & Watson, LLP

(57) ABSTRACT

An ADIP decoder for decoding address in pre-groove (ADIP) of a wobble of an optical disc, has: a band pass filter that filters a wobble signal having a period corresponding to the wobble; a wobble PLL circuit that divides a frequency of a phase-locked clock signal in response to an input of the filtered wobble signal, and outputs a locked wobble signal; a timing generating circuit that generates a sampling timing signal based on the clock signal; an analog to digital converter that converts the filtered wobble signal into a digital signal in synchronization with the sampling timing signal; and an ADIP decoding circuit that counts a clock of the locked wobble signal with a counter, holds an address and one of a minimum amplitude value and a maximum amplitude value of the digital signal for each counter period, the address corresponding to a wobble clock count value where the digital signal has one of the minimum amplitude value and the maximum amplitude value, and that decodes the ADIP based on a distribution of the held address.

12 Claims, 22 Drawing Sheets

OPTICAL DISC APPARATUS AND ADIP DECODER

CROSS-REFERENCE TO RELATED APPLICATION

This application is based upon and claims the benefit of priority from the prior Japanese Patent Application No. 2007-016674, filed on Jan. 26, 2007, the entire contents of which are incorporated herein by reference.

BACKGROUND OF THE INVENTION

1. Field of the Invention

The present invention relates to an ADIP decoder for decoding ADIP and an optical disc apparatus including the ADIP decoder.

2. Background Art

In recent years, recordable optical disc media have become widely available. For example, a DVD+R/RW medium, a recordable optical disc, includes tracks that are made up of recesses called grooves on a flat surface (land) of the disc. The grooves are so formed as to slightly wobble and a wobble signal (a signal varying in voltage according to the wobbling direction of the groove) having a predetermined period is extracted from the wobbling of the grooves.

In DVD+R/RW media, a wobble has a period 32 times as long as a channel bit that is the minimum unit of a recording signal.

Further, in DVD+R/RW media, a sector includes a frame (93-byte length)×26 as a data format and a wobble signal of 93 periods is allocated as a recording format to two frames.

Moreover, in DVD+R/RW media, address in pre-groove (ADIP) is formed in which the phase of a wobble signal is modulated to indicate physical positional information (address) on a disc.

ADIP is formed by providing 1-bit information in two frames and modulating the phases of the first eight periods in a wobble signal of 93 periods. A reproduced signal is read by four sectors, that is, 52 bits, so that a piece of address information is obtained.

Three modulation patterns of ADIP will now be examined. Of the modulation patterns, a sync pattern has a phase inversion point over the first four wobbles (will be referred to as 4T) and acts as an identification pattern indicating the first bit of the 52 bits. The other 51 bits contain a bit0 pattern or a bit1 pattern and form address information, physical information unique to a disc, and information bits including error correcting parity data.

For example, in both of the bit0 pattern and the bit1 pattern, the first wobble is phase inverted. Further, in the bit0 pattern, the seventh and eighth wobbles are phase inverted over two wobble periods. In the bit1 pattern, the fifth and sixth wobbles are phase inverted over two wobble periods (will be referred to as 2T).

For example, when non-inverted wobbles are represented as "0" and inverted wobbles are represented as "1" in the first eight periods in a wobble signal of 93 periods, the following patterns are obtained: sync pattern="11110000", bit0 pattern="10000011" and bit 1 pattern="10001100".

Conventionally, optical disc apparatuses including circuits for decoding ADIP recorded in wobbles have been available. In such an optical disc apparatus, a wobble signal component is extracted by a matrix amplifier from a signal read from a pickup. The wobble signal is stabilized in the amplitude direction by automatic gain control (AGC) and then is inputted to an LPF and a BPF.

In the BPF, only a wobble frequency component is passed through a narrow band and a stable wobble signal is generated. From this signal, a clock with a stable wobble frequency is generated by a PLL circuit. This clock is used as a processing clock for decoding ADP. Further, during recording, this clock is used for generating a recording clock with high tracking capability relative to a disc rotation rate.

On the other hand, in the LPF, components that are higher than the wobble frequency and become noise to a wobble are removed. Such components include information recorded on a disc. After passing through the LPF, the wobble signal is binarized by a binarizing circuit having a proper slice level. A VCO included in a wobble PLL generates a phase and frequency locked clock (hereinafter, will be referred to as a locked wobble) and a clock shifted in phase by a quarter wobble from the locked wobble.

An output signal obtained by inputting the locked wobble and the binarized signal to an Exclusive OR circuit is synchronized by the quarter-delayed clock, so that an ADIP stream can be obtained in which an inverted wobble is represented as "1" and a non-inverted wobble is represented as "0".

The ADIP stream is inputted to an ADIP synchronous demodulator circuit. The ADIP synchronous demodulator circuit performs pattern matching based on the inputted ADIP stream and detects the sync pattern, the bit0 pattern, and the bit1 pattern.

A wobble counter provided in the ADIP synchronous demodulator circuit detects the three patterns, so that eight wobbles indicating ADIP information are matched with the 0 to 7 phases of a scale-of-93 counter.

On the other hand, a line counter provided in the ADIP synchronous demodulator circuit counts up in response to the carry of the wobble counter and measures 52 lines, that is, an ADIP period of four sectors.

The line counter identifies an ADIP unit (that is, the boundary position of 52 bits) in response to the detection of the sync pattern and is reset to "0". Then, a decoding pattern detected according to the value of the line counter undergoes serial-parallel (S/P) conversion in an ADIP demodulator provided in the ADIP synchronous demodulator circuit, so that ADIP demodulation results are obtained for four sectors.

Although the conventional ADIP decoding method can achieve a simple circuit configuration, this method has not reached a practical level for the following reasons:

The first reason is that the above-mentioned LPF has to have a cutoff frequency in a band higher than the wobble frequency to prevent a distorted waveform on an inverted part of ADIP. However, as described above, a wobble is generated in a period of 32 channel bits and in a band close to a recorded signal component.

Consequently, it is necessary to choose whether to increase the cutoff frequency of the LPF to obtain a wobble waveform with a small distortion or to remove a channel frequency component. Therefore, it is not possible to simultaneously obtain a waveform with a small distortion and remove a channel frequency component, so that it is difficult to keep a stable waveform.

In order to avoid this problem, a digital filtering method using an infinite impulse response (IIR) filter and the like is available. This method, however, complicates a circuit configuration and requires a higher sampling resolution, so that the current consumption may be increased.

Further, the waveform of an LPF path may have DC fluctuations due to the influence of crosstalk and the like. Even when, in order to absorb DC fluctuations, a signal is passed through a HPF having a cutoff frequency close to a wobble frequency band, the waveform is distorted. Therefore, it is necessary to choose whether to reduce the cutoff frequency to suppress the occurrence of a distorted waveform while accepting sharp DC fluctuations or to increase tracking capability while accepting a distorted waveform.

The second reason is that in the above-mentioned configuration of the optical disc apparatus, a phase delay varies between the LPF and the BPF due to device-to-device variation. Thus it is necessary to properly adjust the timing of both of the input signals in the Exclusive OR circuit.

Particularly, a recording clock is generated from the above-mentioned BPF and thus the BPF requires a narrow frequency band. Therefore, the phase shift inevitably becomes large when the center frequency of the frequency band is displaced.

When the cutoff frequency of the LPF is brought close to the wobble frequency band, phase characteristics abruptly change and thus the phase shift increases.

The phase delays of the BPF and the LPF are not equal to each other because the BPF and the LPF include different devices and signal paths. The difference in phase delay is also caused by a temperature change. Thus an adjustment may be necessary not only in the manufacturing process but also at the start or during reproduction on a disc. Consequently, the apparatus has poor performance.

Further, an optical disc apparatus is available which uses a technique proposed for improving decoding stability (e.g., see Japanese Patent Laid-Open No. 2004-103184). In this optical disc apparatus, the binarizing circuit of the above-mentioned conventional optical disc apparatus is changed to an analog-digital converter (ADC).

In this conventional optical disc apparatus, a wobble signal having passed through an LPF is inputted to the ADC.

On the other hand, a clock generated in the VCO of a wobble PLL is inputted to a timing generating circuit. The timing generating circuit generates the sampling timing signal of the ADC. The output result of the ADC is inputted to a Viterbi decoding circuit after passing through a digital filter. The Viterbi decoding circuit decodes ADIP by using partial response maximum likelihood (PRML) technique.

The sampling timing of the ADC is adjusted to the top of the wobble signal after filtering in the LPF. Then, this result is filtered through the above-mentioned digital filter to distinguish the singular point of an inverted part.

After that, an ADIP stream is obtained according to a defined Viterbi algorithm. The ADIP stream is determined after being displaced by several wobbles according to Viterbi processing.

This conventional technique can accurately decode ADIP even when waveform integrity deteriorates due to white noise and so on. However, when the sampling timing of the ADC is not properly adjusted and causes a timing delay, reading capability rapidly deteriorates.

Thus a timing adjusting process for compensating variations between the LPF and the BPF is necessary. Moreover, a large Viterbi processing circuit is required for increasing the accuracy of decoding and the circuit size may be increased. Further, the ADC has to be sampled twice for each wobble waveform and has to be operated at high speeds, so that the current consumption may be increased.

SUMMARY OF THE INVENTION

According to one aspect of the present invention, there is provided: an ADIP decoder for decoding address in pre-groove (ADIP) of a wobble of an optical disc, comprising:

a band pass filter that filters a wobble signal having a period corresponding to the wobble;

a wobble PLL circuit that divides a frequency of a phase-locked clock signal in response to an input of the filtered wobble signal, and outputs a locked wobble signal;

a timing generating circuit that generates a sampling timing signal based on the clock signal;

an analog to digital converter that converts the filtered wobble signal into a digital signal in synchronization with the sampling timing signal; and an ADIP decoding circuit that counts a clock of the locked wobble signal with a counter, holds an address and one of a minimum amplitude value and a maximum amplitude value of the digital signal for each counter period, the address corresponding to a wobble clock count value where the digital signal has one of the minimum amplitude value and the maximum amplitude value, and that decodes the ADIP based on a distribution of the held address.

According to the other aspect of the present invention, there is provided: an optical disc apparatus for decoding address in pre-groove (ADIP) of a wobble of an optical disc, comprising:

a band pass filter that filters a wobble signal having a period corresponding to the wobble;

a wobble PLL circuit that divides a frequency of a phase-locked clock signal in response to an input of the filtered wobble signal, and outputs a locked wobble signal;

a timing generating circuit that generates a sampling timing signal based on the clock signal;

an analog to digital converter that converts the filtered wobble signal into a digital signal in synchronization with the sampling timing signal; and an ADIP decoding circuit that counts a clock of the locked wobble signal with a counter, holds an address and one of a minimum amplitude value and a maximum amplitude value of the digital signal for each counter period, the address corresponding to a wobble clock count value where the digital signal has one of the minimum amplitude value and the maximum amplitude value, and that decodes the ADIP based on a distribution of the held address.

BRIEF DESCRIPTION OF THE DRAWINGS

FIG. 3A shows an output waveform of the ADIP circuit when the center frequency is shifted in the negative direction in consideration of device-to-device variations caused by temperature characteristics and so on;

FIG. 3B shows an output waveform of the ADIP circuit when the center frequency is shifted in the negative direction in consideration of device-to-device variations caused by temperature characteristics and so on;

FIG. 3C shows an output waveform of the ADIP circuit when the center frequency is shifted in the negative direction in consideration of device-to-device variations caused by temperature characteristics and so on;

FIG. 4A shows an output waveform of the ADIP circuit when the center frequency is shifted in the positive direction in consideration of device-to-device variations caused by temperature characteristics and so on;

FIG. 4B shows an output waveform of the ADIP circuit when the center frequency is shifted in the positive direction in consideration of device-to-device variations caused by temperature characteristics and so on;

FIG. 4C shows an output waveform of the ADIP circuit when the center frequency is shifted in the positive direction in consideration of device-to-device variations caused by temperature characteristics and so on;

DETAILED DESCRIPTION

Exemplary embodiments of the present invention will now be described with reference to the accompanying drawings.

First Embodiment

Figure 1:
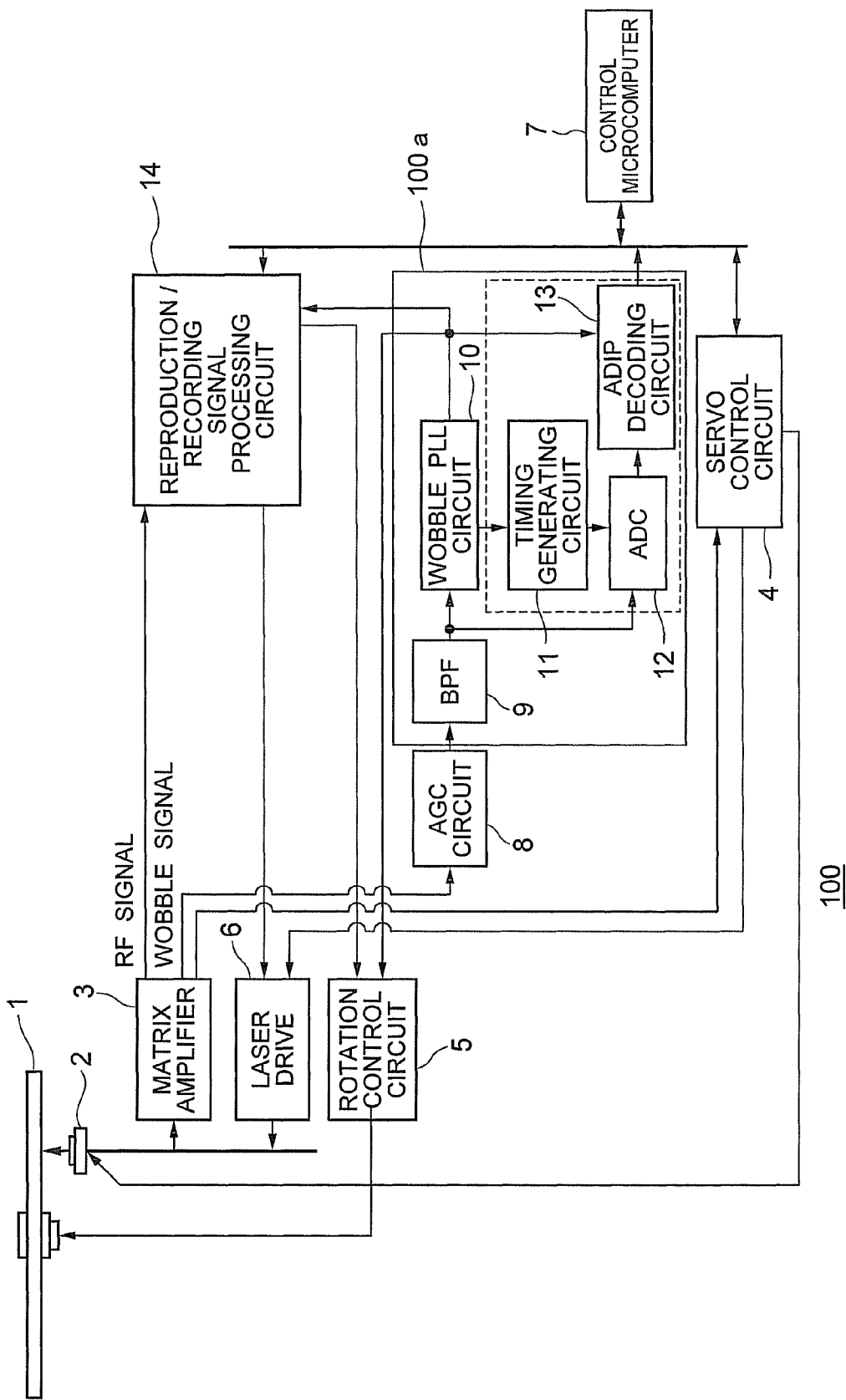
FIG. 1 shows a main configuration of an optical disc apparatus 100 according to a first embodiment which is an aspect of the present invention.

FIG. 1 shows the main configuration of an optical disc apparatus 100 according to a first embodiment which is an aspect of the present invention.

As shown in FIG. 1, the optical disc apparatus 100 includes a pickup 2, a matrix amplifier 3, and a servo control circuit 4.

The pickup 2 emits laser light to an optical disc 1 such as a DVD+R/RW disc and reads reflected light.

The matrix amplifier 3 generates an RF signal, a pre-pit signal, a wobble signal, and a servo signal through operations, based on a reproduction signal obtained from the pickup 2.

The servo control circuit 4 controls operations such as focusing and tracking performed by the pickup 2, based on the servo signal.

The optical disc apparatus 100 further includes a rotation control circuit 5 for controlling the operations of a disc motor for rotating the optical disc 1, and a laser drive 6 for driving the laser of the pickup 2 based on a recording signal.

The pickup 2 includes a quadrant photodetector divided into four sectors of A, B, C and D.

The optical disc apparatus 100 further includes an automatic gain control (AGC) circuit 8, a band pass filter (BPF) 9, and a wobble PLL circuit 10.

The AGC circuit 8 is fed with the wobble signal and stabilizes the wobble signal in the amplitude direction.

The band pass filter (BPF) 9 filters the wobble signal outputted from the AGC circuit 8 with a period corresponding to the wobble.

The wobble PLL circuit 10 divides the frequency of a phase-locked clock signal in response to the input of the wobble signal having been filtered through the band pass filter 9, and outputs a locked wobble signal.

The optical disc apparatus 100 further includes a timing generating circuit 11, an analog to digital converter 12, and an ADIP decoding circuit 13.

The timing generating circuit 11 generates a sampling timing signal based on the clock signal.

The analog to digital converter 12 converts the filtered wobble signal into a digital signal in synchronization with the sampling timing signal.

The ADIP decoding circuit 13 counts the clock of the locked wobble signal with a counter, holds an address and the minimum amplitude value of the digital signal for each counter period, the address corresponding to a clock count value where the digital signal has the minimum amplitude value, and the ADIP decoding circuit 13 decodes ADIP based on the distribution of the held address.

In this configuration, the BPF 9, the wobble PLL circuit 10, the timing generating circuit 11, the ADC 12, and the ADIP decoding circuit compose an ADIP decoder 100a for decoding the address in pre-groove (ADIP) of a wobble on the optical disc 1.

The optical disc apparatus 100 further includes a reproduction/recording signal processing circuit 14 for performing signal processing required for the reproduction and recording of the pickup 2 and outputting a control signal to the laser drive 6 and the rotation control circuit 5.

Recording information outputted from a control microcomputer 7 during recording is inputted to the servo control circuit 4 and the reproduction/recording signal processing circuit 14. Based on this recording information, the servo control circuit 4 and the reproduction/recording signal processing circuit 14 control recording on the optical disc 1.

Figure 2A:
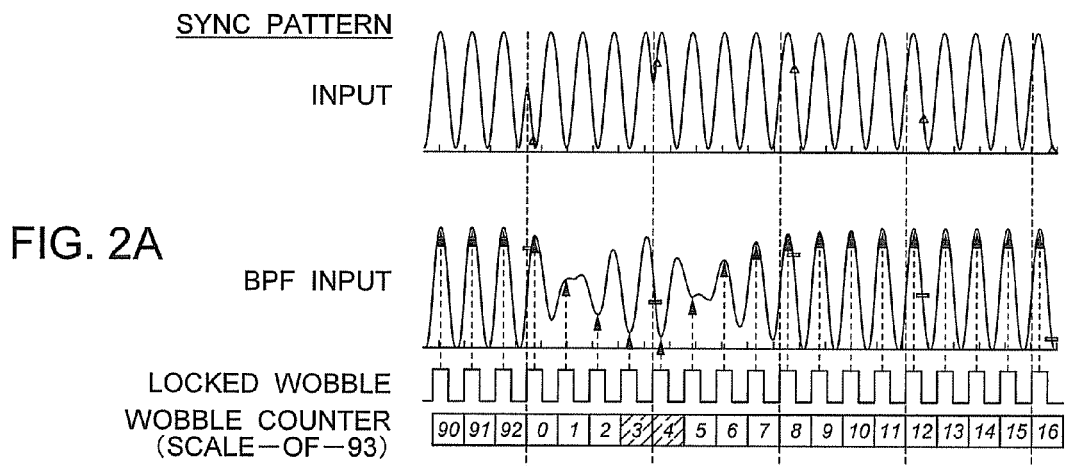
FIG. 2A shows an output waveform of an ADIP circuit when the center frequency of the BPF is placed at the center.
Figure 2B:
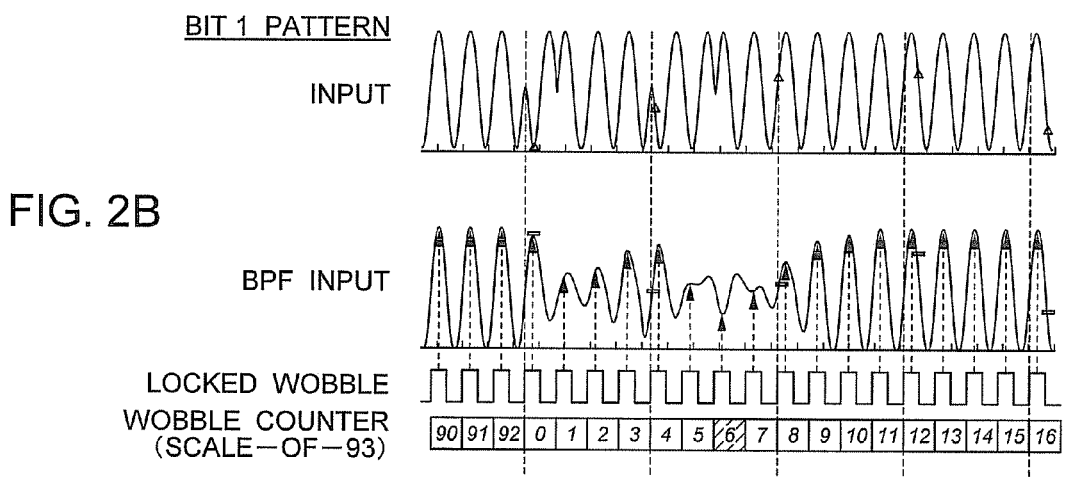
FIG. 2B shows an output waveform of the ADIP circuit when the center frequency of the BPF is placed at the center.
Figure 2C:
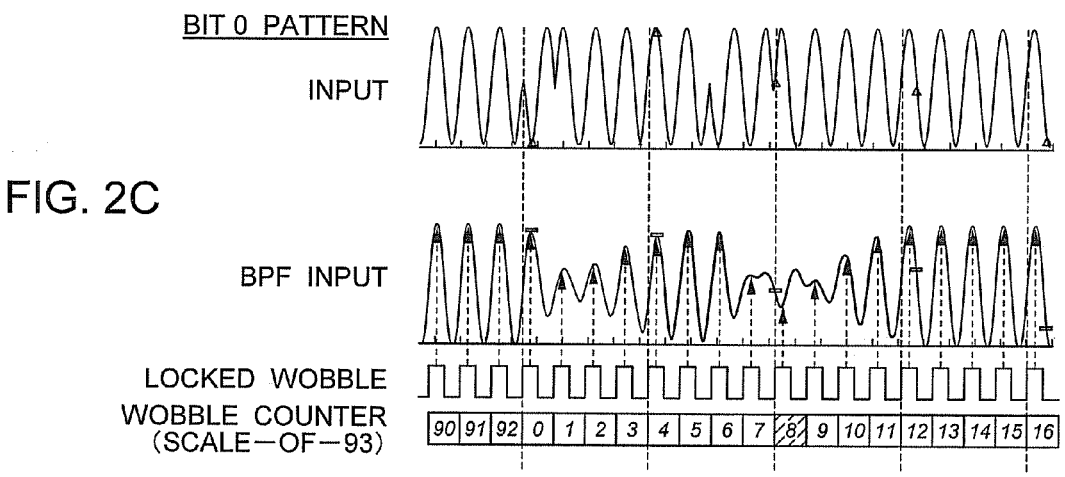
FIG. 2C shows an output waveform of the ADIP circuit when the center frequency of the BPF is placed at the center.
Figure 3A:
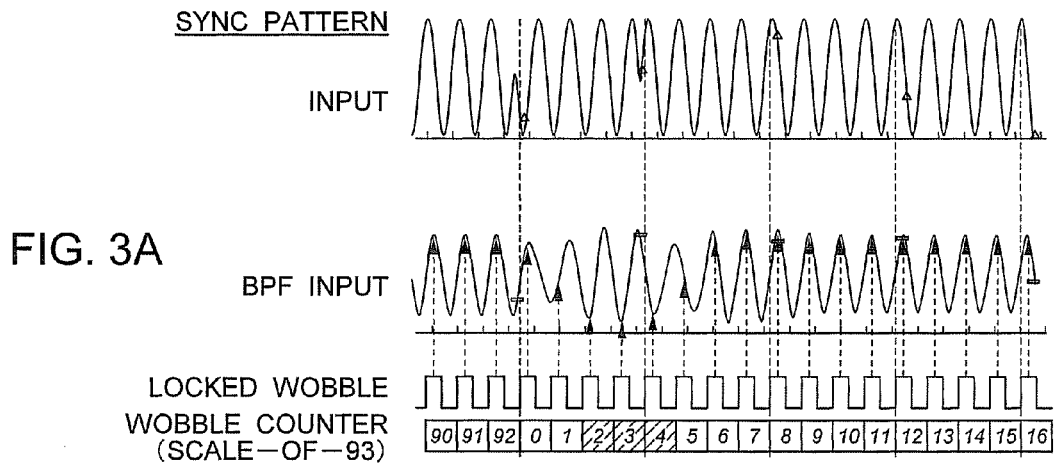
Figure 3B:
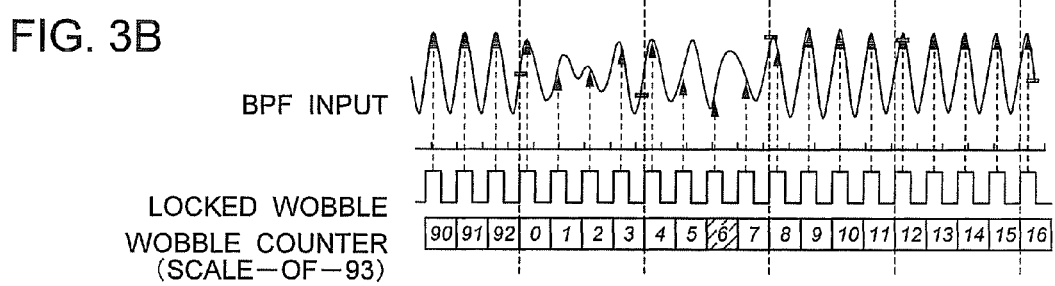
Figure 3C:
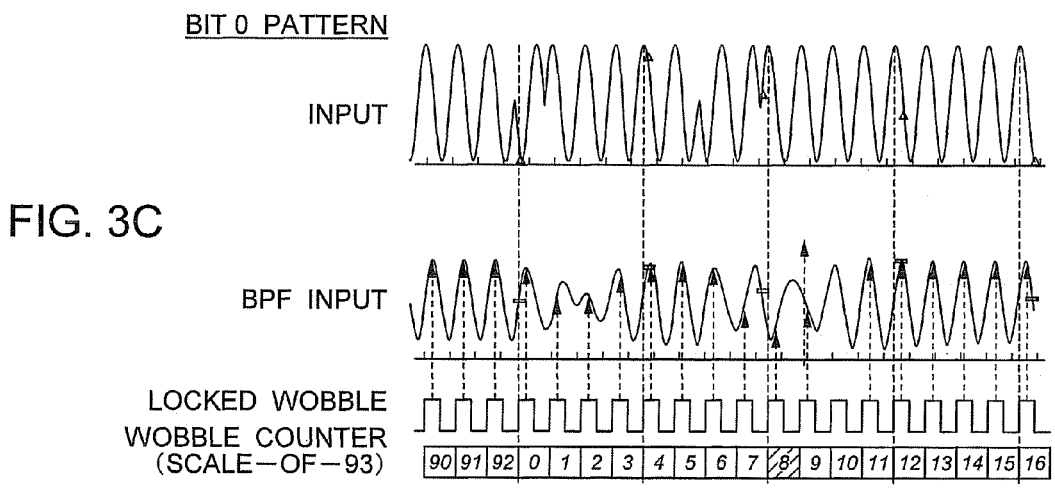
Figure 4A:
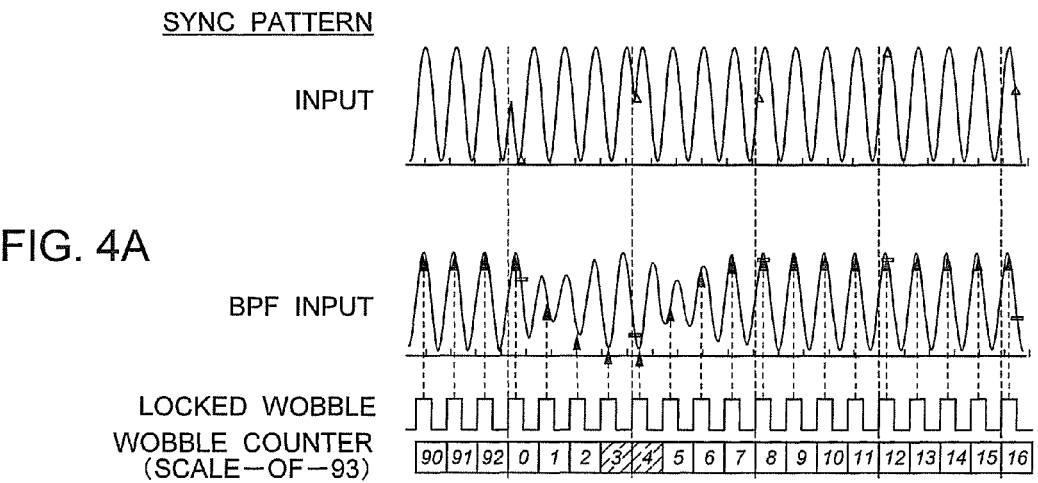
Figure 4B:
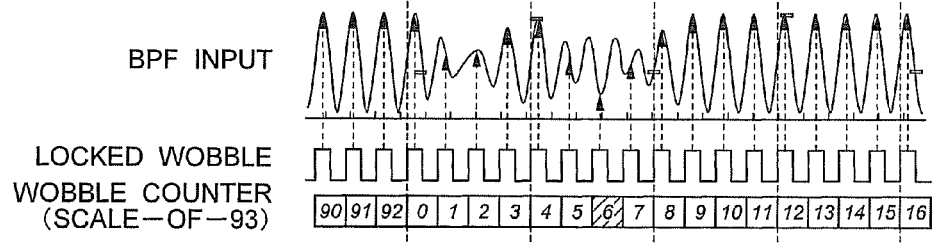
Figure 4C:
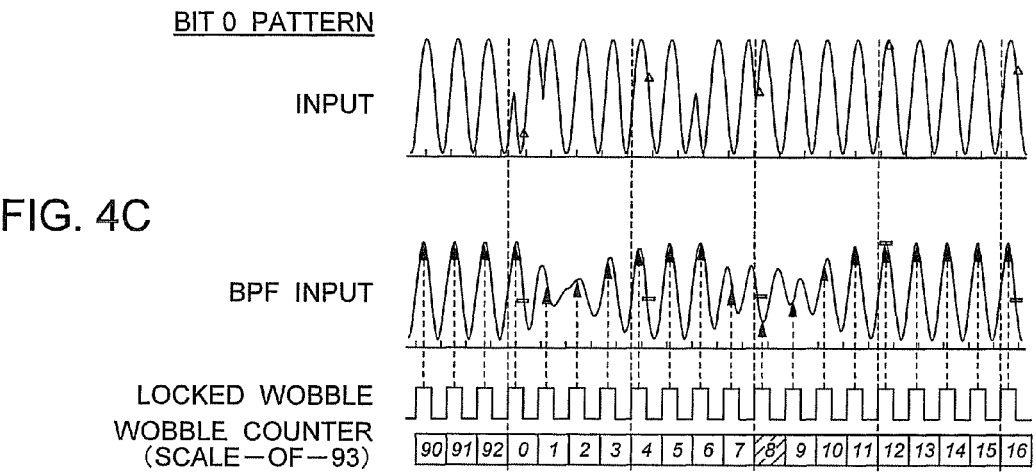

FIGS. 2A to 2C show the output waveforms of the ADIP circuit when the center frequency of the BPF is placed at the center. FIGS. 3A to 3C show the output waveforms of the ADIP circuit when the center frequency is shifted in the negative direction in consideration of device-to-device variations caused by temperature characteristics and so on. FIGS. 4A to 4C show the output waveforms of the ADIP circuit when the center frequency is shifted in the positive direction in consideration of device-to-device variations caused by temperature characteristics and so on.

As shown in FIGS. 2A to 2C, 3A to 3C, and 4A to 4C, when the waveform having been outputted from the BPF is sampled at the center of an "H" section of the locked wobble, singularity for easily identifying the three patterns of the ADIP circuit are found.

The wobble waveform having been outputted from the BPF is distorted by the influence of an inverted part. Because of this influence, a sampling point normally placed on the top of a wobble has a lower potential than the center of a potential in a distorted part.

The position of the distorted part on the waveform is delayed by about 2 wobbles due to the group delay characteristics of the BPF. The three ADIP patterns have different long inverted periods (a sync pattern has 4T and the other patterns have 2T). Thus the relationship between the count value of a scale-of-93 counter for counting with a locked wobble and a low-potential position can be clearly identified for each modulation pattern.

In all of the drawings, a sampling point has a low potential when a wobble (scale-of-93) counter is set to "2" to "4" in the sync pattern, when the counter is set to "6" in a bit1 pattern, and when the counter is set to "8" in a bit0 pattern. Further, high waveform stability is proved from waveform results obtained when the center frequency is displaced.

Further, as described above, the BPF requires abruptly changing frequency characteristics because the BPF is originally used for generating a recording clock and the like.

Thus a disadvantageous channel frequency band in the LPF is cut, so that high-frequency noise is eliminated and variations in DC level are also eliminated.

Therefore, resistance to some disturbance is obtained and there is little probability that a potential on the sampling point in an unmodulated region is lower than a potential on the waveform distortion in a modulated part.

Moreover, the signal having been outputted from the BPF is decoded and sampling timing from the wobble PLL is generated based on the same signal. Thus it is possible to completely eliminate the need for a phase adjusting process provided for disadvantageous variations between the LPF and the BPF in the prior art.

For the above reason, by using the characteristics of the BPF having an inverted portion as a waveform distortion, the singular point of the sampling result is detected and the modulation pattern is estimated based on the detection result, thereby achieving ADIP decoding with high accuracy and stability without the necessity for an adjusting process.

In this case, the BPF is a typical biquadratic BPF and Q=about 2.8 is set. When the degree or Q is changed, the frequency, the phase, and the group delay characteristics are naturally changed. However, only a position and a potential where the singularity of a modulated part appears in sampling results are changed and the same principle can be used.

The following is a specific method of detecting the sampling singular point and decoding ADIP.

In FIG. 1, the laser power, tracking, focusing, feed and the like of the pickup 2 are properly controlled by the servo control circuit 4, and the pickup 2 reads a signal based on light reflected from a desired position of the optical disc 1.

Similarly, the rotation control circuit 5 adjusts the disc motor to have a desired rpm.

The matrix amplifier 3 is fed with the reproduced signal from the pickup 2 and generates the RF signal (main data), the wobble signal, and the servo signal.

In this case, the wobble signal is obtained from the subtraction signal of two signals divided in the tracking direction of a photodetector (not shown), that is, from a so-called push-pull signal. The generated wobble signal further undergoes proper gain adjustment and then is inputted to the AGC circuit 8.

On the optical disc 1 such as a DVD+R/RW disc, recording is performed according to the CLV scheme. To the wobble signal, the leak of a wobble signal having a different phase is added from an adjacent track. The waveform becomes larger in phase with the adjacent track and the waveform becomes smaller in opposite phase with the adjacent track.

The AGC circuit 8 suppresses the fluctuations of the waveform and fixes the amplitude.

The wobble signal outputted from the AGC is inputted to the BPF. The BPF has abruptly changing frequency characteristics allowing only passage through a wobble frequency band. As a result, the wobble signal is generated with high stability.

The wobble signal outputted from the BPF is inputted to the wobble PLL circuit 10 and a locked wobble equivalent to a stable wobble frequency is obtained.

Figure 5:
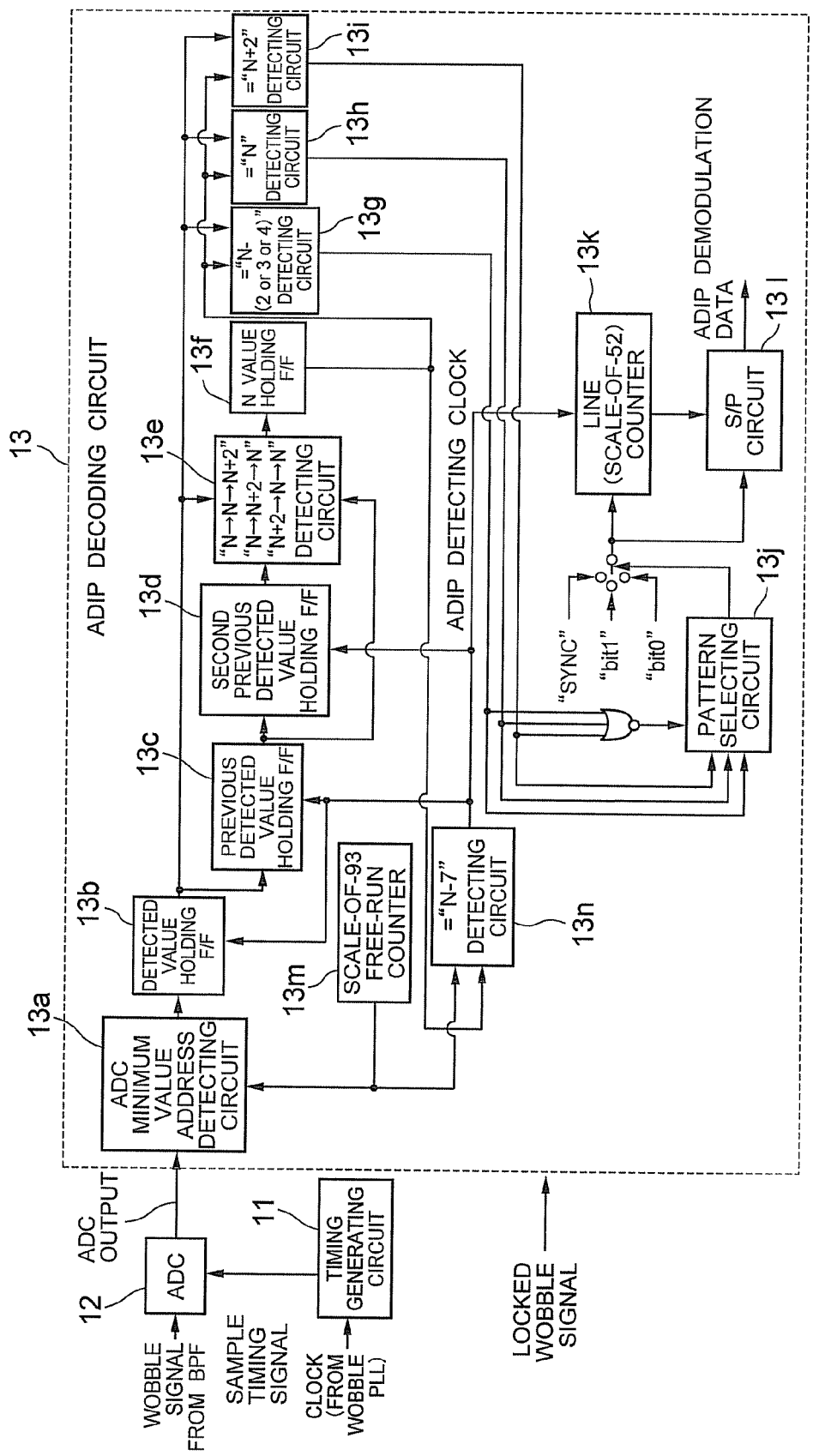
FIG. 5 shows a circuit configuration for decoding ADIP according to the first embodiment, in a part indicated by a dotted line in FIG. 1.

FIG. 5 shows a circuit configuration for decoding ADIP according to the first embodiment, in a part indicated by a dotted line in FIG. 1.

As shown in FIG. 5, the ADC 12 is fed with the wobble signal (the same signal as the signal inputted to the wobble PLL circuit 10) having been processed by the BPF 9.

The timing generating circuit 11 is fed with a clock having a higher frequency than a wobble synchronized with the wobble signal, from the VCO of the wobble PLL circuit 10. Then, the timing generating circuit 11 generates the sampling timing signal of the ADC 12 and outputs the signal to the ADIP decoding circuit 13. Further, the ADIP decoding circuit 13 is fed with the locked wobble signal from the wobble PLL circuit 10.

Figure 6:
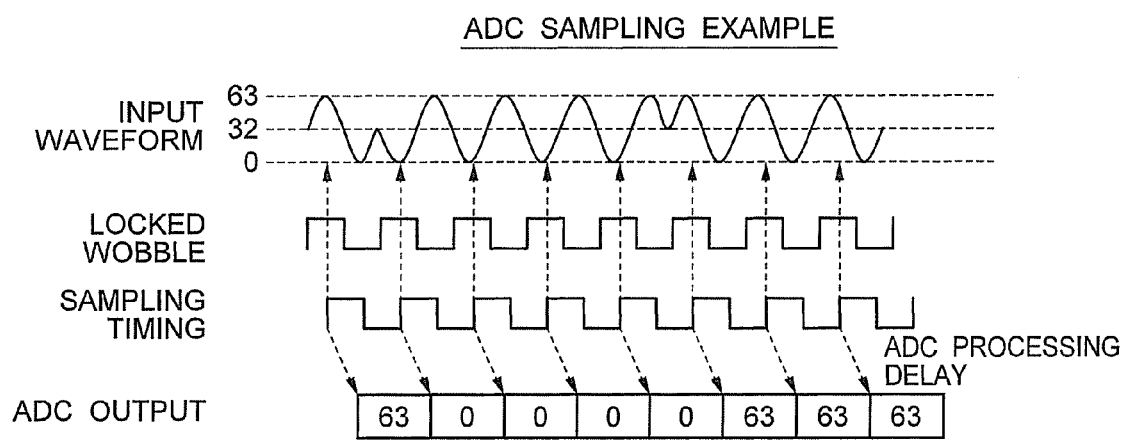
FIG. 6 shows a sampling operation of an ADC.

FIG. 6 shows the sampling operation of the ADC.

The ADC 12 is desirably a flash type ADC quickly determining conversion results, in order to achieve high-speed processing.

FIG. 6 shows a timing example of sequential comparison in which a comparator potential is sequentially changed. In the sequential comparison, the timing of determination is delayed but a relatively small circuit area is achieved. The processing time is not allowed to exceed a wobble waveform. Further, in this case, the ADC has a 6-bit resolution.

An input waveform shown in FIG. 6 has an ADIP sync pattern with high integrity (the waveform is not distorted). However, as described above, the ADIP sync pattern outputted from the BPF is not identical to the ADIP sync pattern with high integrity and has a waveform considerably distorted due to the influence of an inverted part.

As shown in FIGS. 2 to 4, the sampling timing of the ADC is generated so as to be placed at the center of the "H" level of the locked wobble, that is, on the top of the wobble in a stable non-inverted region.

When the ideal input waveform shown in FIG. 6 is provided over the D range of the ADC, the ADC has the maximum output value of "63" in a non-phase inverted part and has the minimum output value of "0" in an inverted part.

Figure 7:
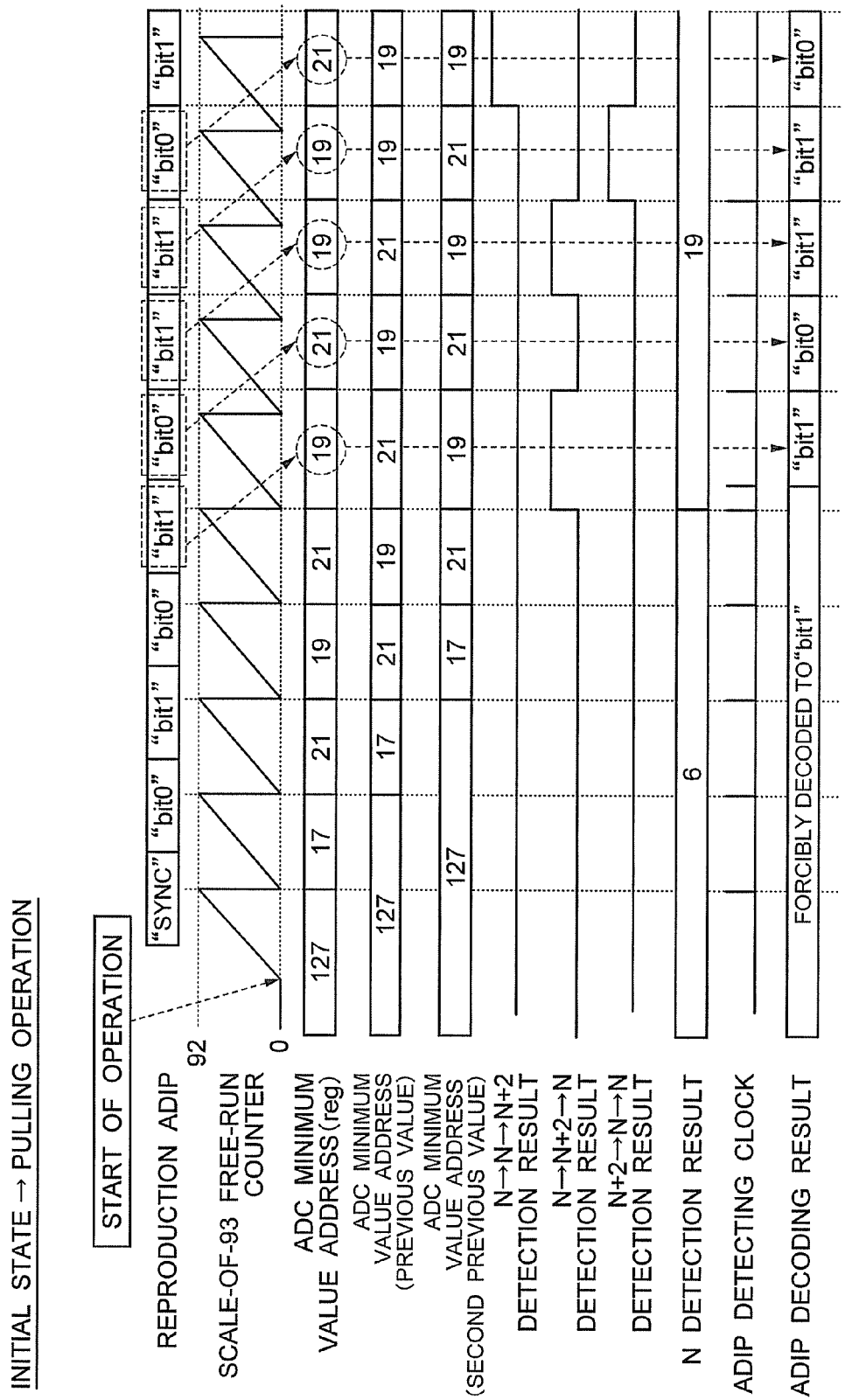
FIG. 7 is a timing chart showing variations in register value in each counter period.

FIG. 7 is a timing chart showing variations in register value in each counter period.

In the timing chart of FIG. 7, during measurements of a scale-of-93 free-run counter (wobble counter) 13m in a period, an ADC value and a counter value at the minimum ADC output result are held in detected value holding F/Fs 13b and 13c. These values are held when an address value reaches "N−7". In this case, N is "6" in the initial state. In other words, in the initial state, the ADC value and the counter value are detected at the address having the minimum value of "92" (6−7=1 and "92" is obtained by the scale-of-93 counter) which is obtained while the counter value changes from "0", to "92".

In the timing chart of FIG. 7, the initial value of an ADC minimum value register is set to the bit full value of the counter and is preset to "127" that is impossible as an address value.

In FIG. 5, an ADC minimum address detecting circuit 13a detects the ADC value and the counter value of the counter 13m at the minimum output result of the ADC 12, and outputs the values to the detected value holding F/F 13b.

Further, in FIG. 5, the previous detected value holding F/F 13c and a second previous detected value holding F/F 13d are flip-flops which shift and hold the output value of the detected value storing F/F 13b every time the address value reaches "N−7" ("92" in the initial state).

Moreover, in FIG. 5, an "N→N→N+2" "N→N+2→N" "N+2→N→N" detecting circuit 13e detects that the output values of the detected value storing F/F 13b, the previous detected value storing F/F 13c, and the second previous detected value storing F/F 13d have the relationship of "N→N→N+2" "N→N+2→N" "N+2→N→N".

As shown in FIG. 7, the ADC minimum value address changes from the initial value of "127" to "17", "21" "19" and "21,".

In this case, when the output values of the F/Fs 13b to 13d reach "19, 21, 19", the detection result of the "N→N+2→N" detecting circuit 13e becomes active. At this point, "19" is set as an N value in an N value holding F/F 13f. Thereafter, the N value is set in the N value holding F/F 13f when one of the three conditions of the "N→N→N+2" "N→N+2→N" "N+2→N→N" detecting circuit 13e is satisfied.

As shown in FIG. 7, the set conditions successively appear but the set N value does not change from "19".

An ADIP detecting clock shown in FIG. 5 is a pulse generated in response to the output result of a "=N−7" detecting circuit 13n when the wobble counter value reaches "N−7".

In FIG. 7, for example, when the N value is "6", the initial value, the pulse is generated at the counter value of "92" of the scale-of-93 free-run counter. After the N value reaches "19", the pulse is generated at the counter value "12" of the scale-of-93 free-run counter.

Further, a value for shifting the ADC minimum value address (reg) changes from the counter value of "92" in the initial state to "13". In other words, in a 93-wobble period during which the counter value changes from "14" to "92" and "0" to "13", address values at which the ADC has the minimum value are sequentially held.

At this point, a pattern selecting circuit 13j in FIG. 5 compares the N value and the ADC minimum value address. According to the comparison, the pattern selecting circuit 13j selects one of the three modulation patterns of ADIP and outputs the selection result. In other words, the pattern selecting circuit 13j receives the condition matching results of a "=N−(2 or 3 or 4)" detecting circuit 13g, an "N" detecting circuit 13h, and an "N+2" detecting circuit 13i based on the relationship between the N value and the ADC minimum value address, and selects one of the sync pattern, the bit1 pattern, and the bit0 pattern according to the result.

When any one of the conditions is not detected, the pattern selecting circuit 13j selects, e.g., the bit1 pattern as a fixed pattern. The selection result is represented as a 2-bit signal. For example, the selection result is represented as "0b11" for the sync pattern, "0b00" for the bit0 pattern, and "0b01" for the bit1 pattern. The selection result is inputted with the ADIP detecting clock to a line (scale-of-52) counter 13k and an S/P circuit 13l.

The line counter 13k decides the boundary position of 52-bit ADIP data in response to the detection result of the pattern selecting circuit 13j, like the line counter function of the prior art.

The S/P circuit 13l converts the modulation pattern selection result from serial to parallel by using the value of the line counter 13k and the ADIP detecting clock, and finally outputs ADIP demodulation data.

The following will discuss the reason why the above-mentioned method can correctly decode ADIP.

As shown in FIGS. 2 to 4, during measurements of the scale-of-93 wobble counter 13m on the three modulation patterns of ADIP in a single period, the lowest potential is obtained substantially at a constant value in the sampling results.

In FIGS. 2 to 4, on an ADIP modulation region starting wobble, that is, on a wobble where a phase is always inverted in each modulation pattern (at the front of 4T in the sync pattern and at 1T in the other patterns), the counter value is set to "0". In this case, the lowest potential is obtained at "2", "3" or "4" in the sync pattern, at "6" in the bit1 pattern, and at "8" in the bit0 pattern.

In other words, a distance between these positions is substantially "2". Regarding the bit1 and bit0 patterns in which the position of 2T is separated by a distance of "2" according to a modulation rule, a distance of "2" between the minimum potential positions is always kept even when considering variations in the center frequency of the BPF.

The sync pattern is also substantially separated from the bit1 pattern by a distance of "2". The inversion period is relatively long in a 4T pattern and thus the sync pattern fluctuates from "2" to "4" due to variations in center frequency. However, in reality, since the counter is a free-run counter, a phase difference from the ADIP modulation region occurs in most cases (92/93 probability) and the address value is shifted by the phase difference. However, the above-mentioned distance relationship is not changed.

In the present embodiment, the amount of shift is first detected and then the ADIP modulation pattern is estimated based on the detected ADC minimum value address.

The following will discuss the detection of a phase difference, that is, a process of detecting an N value.

In this process, by using the stable distance relationship between the bit1 pattern and the bit0 pattern, a position is detected where the minimum potential is obtained in the bit1 pattern (address value "6" in FIGS. 2 to 4). In some cases, a distance between the sync pattern and the bit1 pattern is "2" but the sync pattern is generated only once out of 52 times.

Thus only the relationship of bit1, bit1, and bit0 can obtain three consecutive detection results of N, N and N+2 (not in particular order). The detected N value (in this case, "25") indicates the minimum value address in the bit1 pattern (address value "6" in FIGS. 2 to 4).

Therefore, after that, the patterns can be distinguished from one another as follows: N+2 ("27" in this example) indicates the bit0 pattern, N ("25" in this example) indicates the bit1 pattern, and N−2, N−3, and N−4 ("21", "22" and "23" in this example) indicate the sync pattern.

When the address value is not equal to any one of the above values, that is, a three-input NOR output in FIG. 5 is "H", for example, the bit1 pattern is selected.

Further, as shown in the timing chart of FIG. 7, ADIP is forcibly decoded to the bit1 pattern also in a period from the initial state to the determination of the N value (or the ADIP detecting clock may not be generated). ADIP may be decoded to the patterns other than the sync pattern and thus ADIP may be forcibly decoded to the bit0 pattern.

In the configuration of FIG. 5 showing the "==N−(2 or 3 or 4)" detecting circuit 13g, the "N" detecting circuit 13h, and the "N+2" detecting circuit 13i, the "N" detecting circuit 13h may be omitted and ADIP may be decoded to the bit1 pattern when the detection results of the other two patterns are not active. Thus the circuit size can be further reduced.

When values including N−2, N−3, N−4 and N+2 exceed 92 or fall below 0, correction is necessary in consideration of base 93 notation.

The N value is detected even after the determination. N values held in the N value holding F/Fs are not changed unless a track jump or the like changes the amount of shift, that is, the phase relationship between the ADIP modulation region and the counter.

The following will discuss operations when a track jump or the like from a steady state changes the phase relationship between the ADIP modulation region and the counter, that is, the N value according to the first embodiment.

Figure 8:
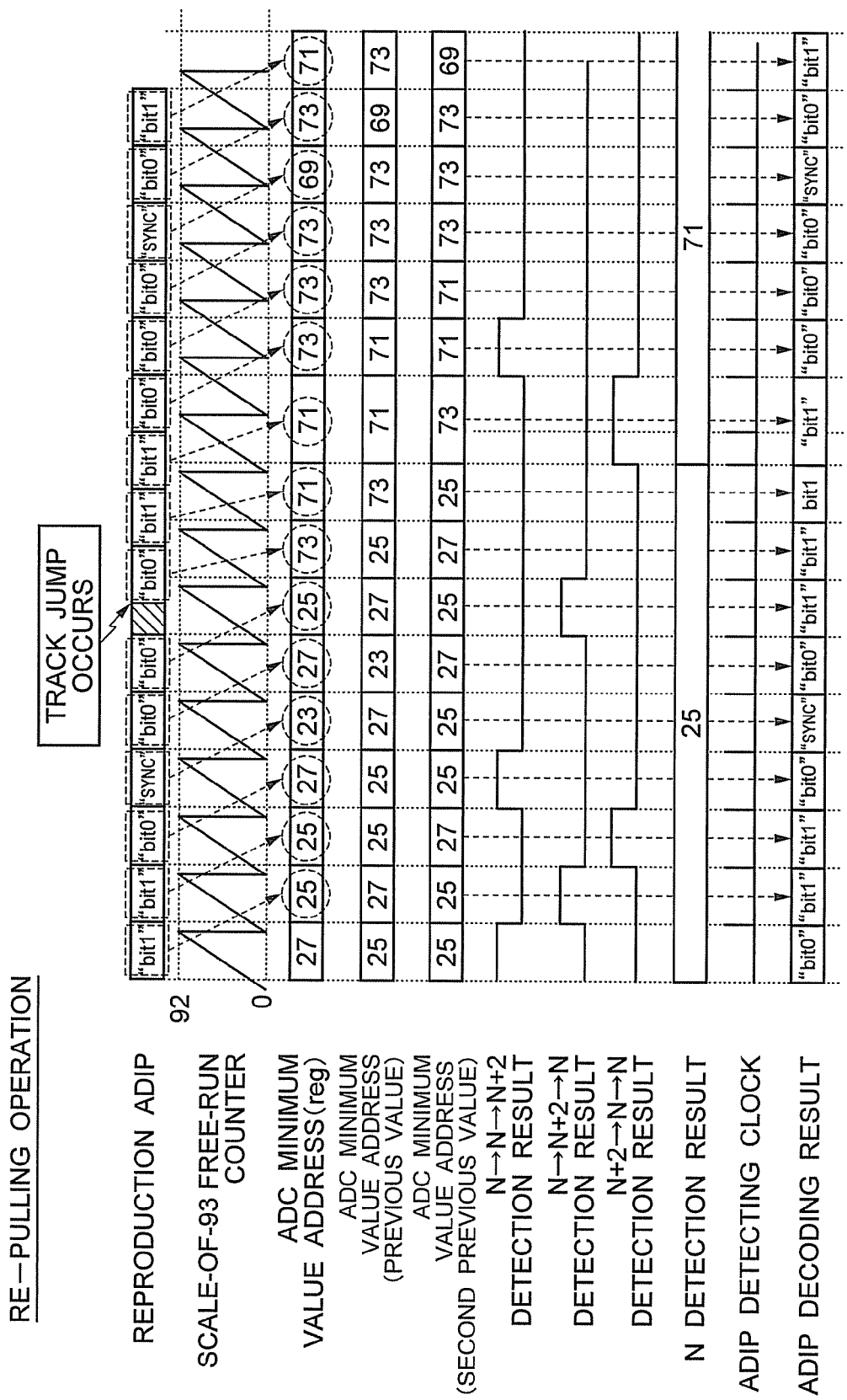
FIG. 8 is a timing chart showing operations when a track jump or the like from a steady state changes a phase relationship between an ADIP modulation region and a counter, that is, the N value.

FIG. 8 is a timing chart showing operations when a track jump or the like from a steady state changes the phase relationship between the ADIP modulation region and the counter, that is, the N value.

In FIG. 8, the N value is "25" before a track jump. The occurrence of a track jump changes the phase relationship between the wobble counter and the ADIP modulation region and the N value is pulled back to N="71".

Immediately after the track jump, the ADC minimum value address (reg) is set to "73". In this case, ADIP is forcibly decoded to the bit1 pattern according to the above-mentioned processing method.

Since any one of the pull-in conditions of "N→N→N+2" "N→N+2→N" "N+2→N→N" is not satisfied, the N value is not changed from "25".

Next, when the value changes to "73"→"71"→"71", the output of the "N→N→N+2" "N→N+2→N" "N+2→N→N" detecting circuit 13e becomes active and the N value is set to "71" in the N value holding F/F 13f.

Thereafter, the ADC minimum value address determined in the 93 wobble period from addresses of "65" to "92" and "0" to "64" is held and the ADIP detecting clock is outputted on the address of "64" (N−7) that is a determined phase.

When the detected ADC minimum value address is "67", "68" or "69", ADIP is decoded to the sync pattern. When the detected ADC minimum value address is "71", ADIP is decoded to the bit1 pattern. When the detected ADC minimum value address is "73", ADIP is decoded to the bit0 pattern.

As described above, according to the optical disc apparatus of the present embodiment, it is possible to more stably decode the ADIP of the wobble signal while reducing the circuit size, reducing power consumption, and simplifying the adjusting process.

In the explanation of the present embodiment, the minimum amplitude value of the digital signal is used as a reference value for decoding ADIP.

However, the maximum amplitude value of the digital signal may be used as a reference value for decoding ADIP. In this case, the ADIP decoding circuit 13 counts the clock of the locked wobble signal with a counter, holds an address and the maximum amplitude value of the digital signal for each counter period, the address corresponding to a clock count value where the digital signal has the maximum amplitude value. Further, the ADIP decoding circuit 13 decodes ADIP based on the distribution of the held address. Also in other configurations, the present embodiment and other embodiments can be explained by replacing the 'minimum amplitude value' with the "maximum amplitude value" of a digital signal.

Second Embodiment

The first embodiment described the configuration in which an address and the minimum amplitude value of the digital signal outputted by the ADC are held for each counter period, the address corresponding to a wobble clock count value where the digital signal has the minimum amplitude value, and ADIP is decoded based on the distribution of the held address.

The present embodiment will describe another configuration for decoding ADIP.

The configuration of an optical disc apparatus is similar to that of the optical disc apparatus 100 shown in FIG. 1. The ADIP decoding circuit 13 of FIG. 1 is replaced with an ADIP decoding circuit 213 in the present embodiment.

Figure 9:
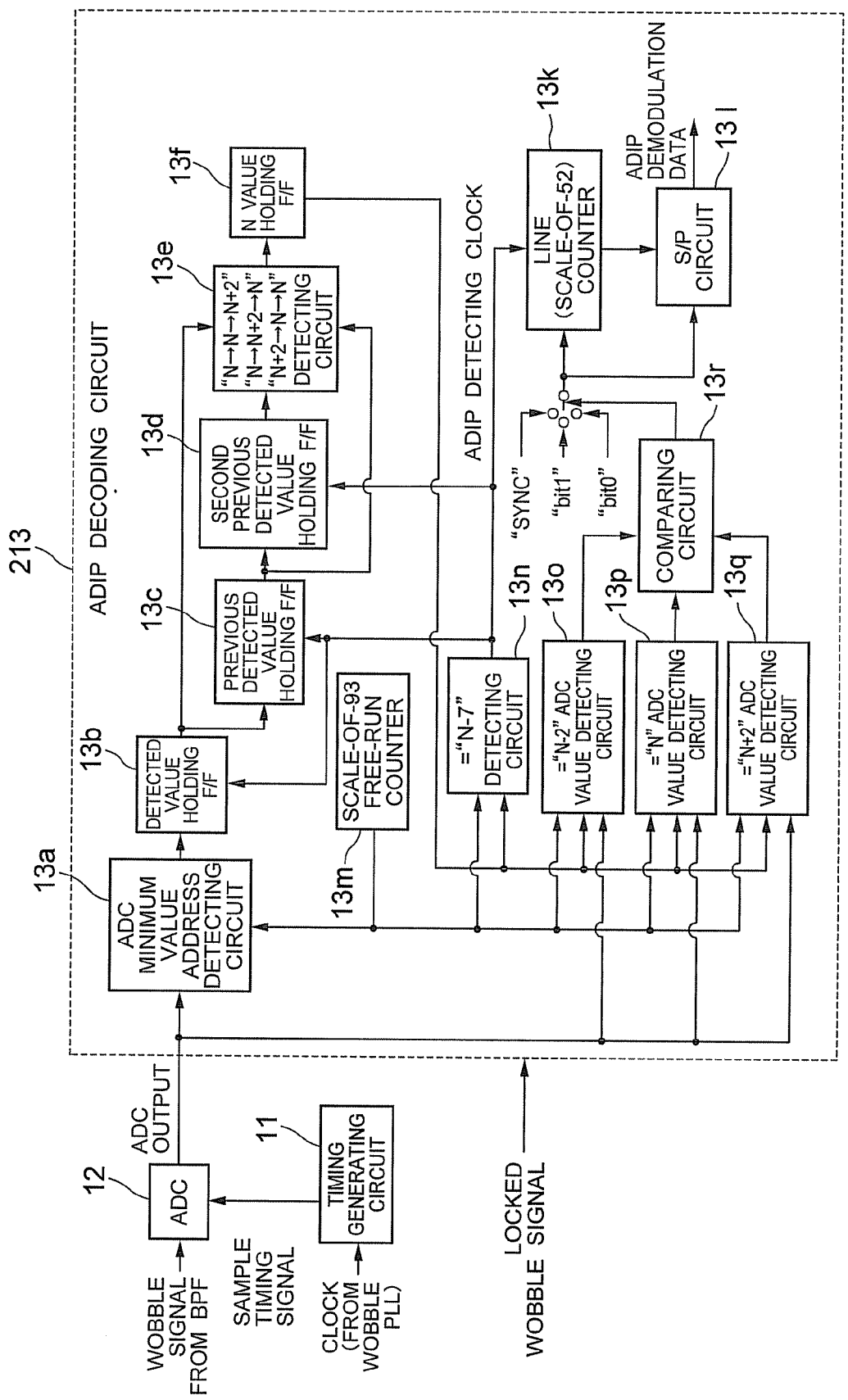
FIG. 9 shows a circuit configuration for decoding ADIP according to a second embodiment which is an aspect of the present invention, in a part indicated by a dotted line in FIG. 1.

FIG. 9 shows a circuit configuration for decoding ADIP according to a second embodiment which is an aspect of the present invention, in a part indicated by a dotted line in FIG. 1. The configurations indicated by the same reference numerals as the first embodiment are similar to those of the first embodiment.

As shown in FIG. 9, an ADC 12 is fed with a wobble signal (the same signal as the signal inputted to a wobble PLL circuit 10) having been processed by a BPF 9.

A timing generating circuit 11 is fed with a clock having a higher frequency than a wobble synchronized with the wobble signal, from the VCO of the wobble PLL circuit 10. Then, the timing generating circuit 11 generates the sampling timing signal of the ADC 12 and outputs the signal to the ADIP decoding circuit 213. The ADIP decoding circuit 213 is fed with a locked wobble signal from the wobble PLL circuit 10.

Comparing with the operations of the first embodiment, the operations in an ADC minimum value address detecting circuit 13a, a detected value holding F/F 13b, a previous detected value holding F/F 13c, a second previous detected value holding F/F 13d, and the detection of an N value in an "N→N→N+2" "N→N+2→N" "N+2→N→N" detecting circuit 13e in the ADIP decoding circuit 213 are similar to those of the first embodiment. Only a decoding operation of modulation patterns is different in the present embodiment.

As shown in FIG. 9, unlike the first embodiment, the ADIP decoding circuit 213 includes a =="N−2" ADC value detecting circuit 13o, a =="N" ADC value detecting circuit 13p, a == "N+2" ADC value detecting circuit 13q, and a comparing circuit 13r for comparing the output values of the detecting circuits. The ADIP decoding circuit 213 performs switching based on the comparison result of the comparing circuit 13r and determines a modulation pattern.

The following will specifically describe a method of deciding a modulation pattern according to the second embodiment.

As in the first embodiment, in the ADIP decoding circuit 213, an ADIP detecting clock is generated by an "N−7" detecting circuit 13n after an N value is detected, and the ADC minimum value address is held on the position.

On the other hand, as shown in FIG. 9, when the ADC minimum value address is "N−2", "N", and "N+2", ADC output results are held in the "==N−2 ADC value" detecting circuit 13o, the "==N ADC value" detecting circuit 13q, and the "==N+2 ADC value" detecting circuit 13q, respectively. These results are compared by the comparing circuit 13r. As a result of the comparison, when the minimum address value is "N−2", the ADIP decoding circuit 213 decides that the modulation pattern is a sync pattern. When the minimum address value is "N", the ADIP decoding circuit 213 decides that the modulation pattern is a bit1 pattern. When the minimum address value is "N+2", the ADIP decoding circuit 213 decides that the modulation pattern is a bit0 pattern. Then, the ADIP decoding circuit 213 performs switching.

In the deciding method of the second embodiment, as described above, the modulation patterns are decoded by comparing ADC output values detected at three address values where the ADC output values can be minimized by the modulation patterns.

In other words, the ADIP decoding circuit 213 counts the clock of the locked wobble signal with a counter, and holds an address and the minimum value of the digital signal for each counter period, the address corresponding to a wobble clock count value where the ADC output value (the amplitude value of a digital signal) is minimized. Further, the ADIP decoding circuit 213 decodes ADIP based on the distribution of the held address and the ADC output value (the amplitude value of the digital signal) corresponding to the address.

As shown in the examples of FIGS. 2 to 4, the address where the ADC output value is minimized is stabilized to "6" in the bit1 pattern and is stabilized to "8" in the bit0 pattern. However, the address varies among "2", "3" and "4" in the sync pattern.

However, in the sync patterns of FIGS. 2 to 4, "4" distinctly has the lowest potential among "4", "6" and "8". Thus such variations are not disadvantageous in this comparing method.

In this method, when the lowest value cannot be limited to one in comparison due to erroneous detection and so on, protection may be provided to forcibly decode ADIP to the bit1 pattern as described above.

Further, during comparison, when the smallest ADC output value has a high potential such as "61", the influence of phase inversion is clearly absent and the high potential has been caused by variations in value on the top of a wobble. Therefore, when the potential is not lower than a predetermined value such as "32" that is an intermediate potential, protection may be similarly provided to forcibly decode ADIP to other values such as bit1 and bit0 except for the sync pattern.

In the modulation pattern decision of the second embodiment, the circuit including the comparator is slightly larger as compared with the decision method of the first embodiment. However, the method of the second embodiment achieves resistance to disturbance.

Figure 10:
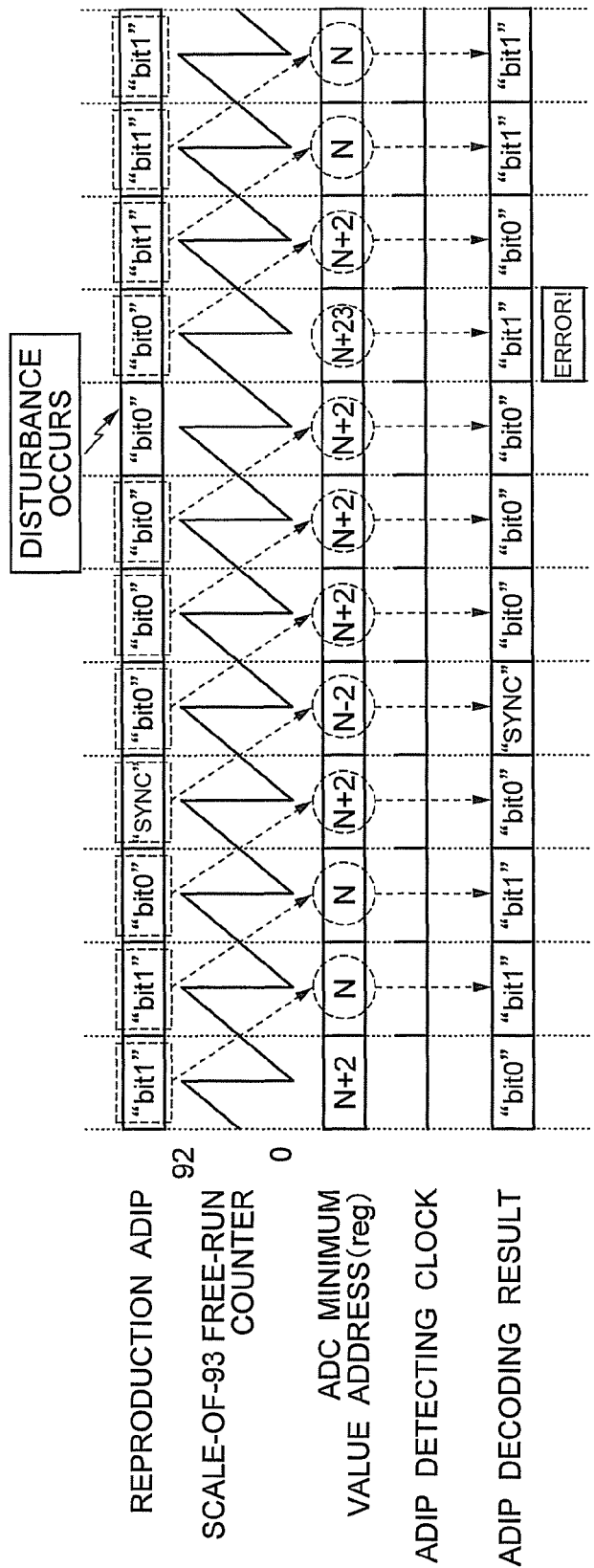
FIG. 10 is a timing chart showing the decoding results of the first embodiment in the event of disturbance such as a scratch.
Figure 11:
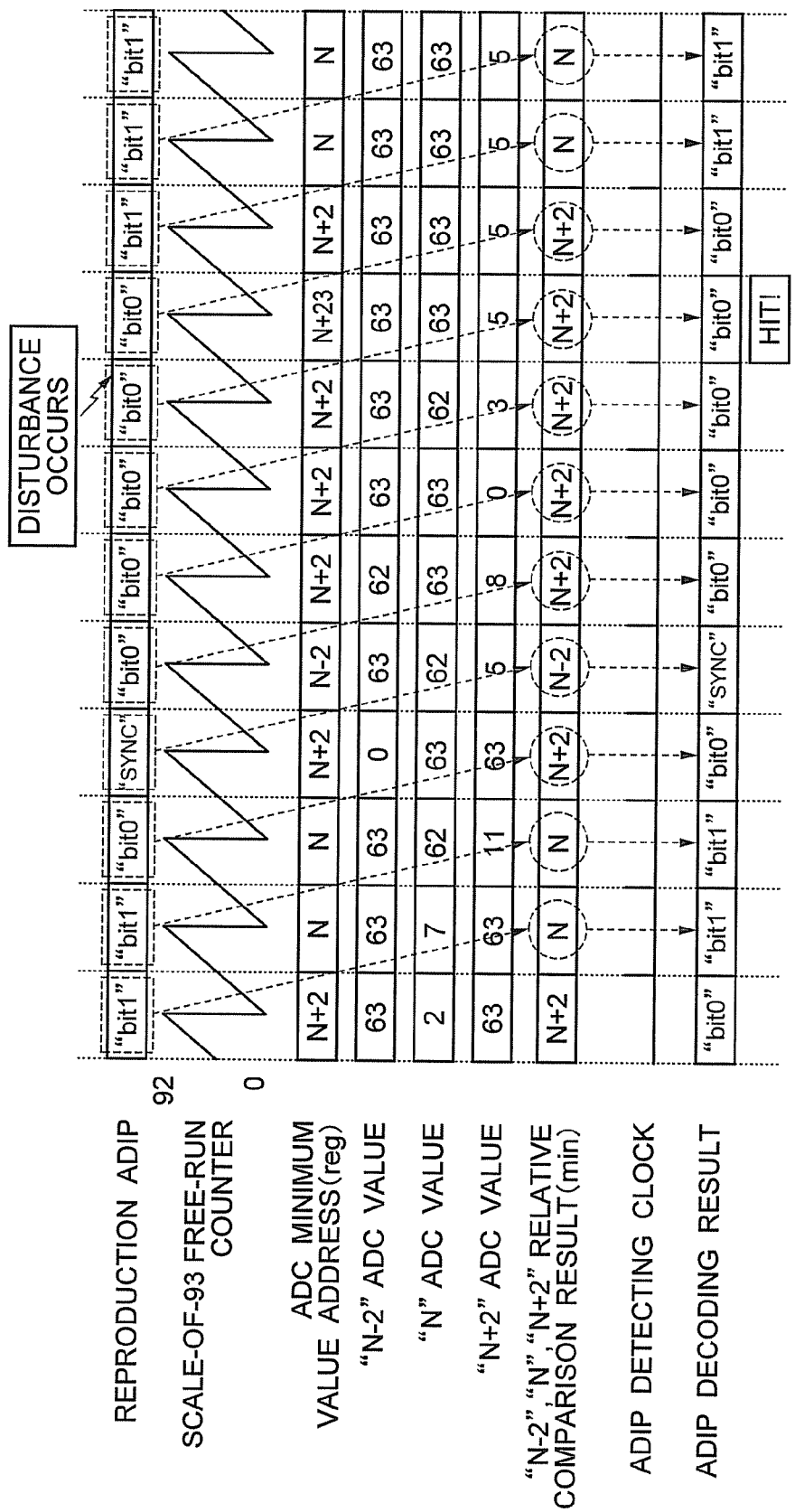
FIG. 11 is a timing chart showing the decoding results of the second embodiment in the event of disturbance such as a scratch.

The reason why will be discussed below. FIG. 10 is a timing chart showing the decoding results of the first embodiment in the event of disturbance such as a scratch. FIG. 11 is a timing chart showing the decoding results of the second embodiment in the event of disturbance such as a scratch.

As shown in FIG. 10, the disturbance appears in the ADIP word period of the intermediate bit0 pattern. The disturbance, however, does not appear in a phase modulation region indicating bit0 but appears in an unmodulated region. Consequently, it is assumed that the ADC minimum value address reaches "N+2" where the ADC output value is supposed to be "N+2" in the bit0 pattern under normal conditions, that is, the ADC output result at "N+23" has a smaller value than the ADC output result at "N+2".

As shown in FIG. 10, in the modulation pattern decision of the first embodiment, the ADC minimum value address is not any one of "N−(2 or 3 or 4)", "N", and "N+2" as described above and thus the protecting function of forcibly decoding ADIP to the bit1 pattern is performed, resulting in an erroneous decision.

On the other hand, as shown in FIG. 11, in the modulation pattern decision of the second embodiment, the ADC output value is "63" at "N−2", the ADC value is "63" at "N", and the ADC value is "5" at "N+2". As a result of comparison of these values, "N+2" has the smallest value and the bit0 pattern can be identified without errors.

In this way, the present embodiment achieves higher resistance to the influence of disturbance such as a scratch in the unmodulated region as compared with the first embodiment.

As described above, according to the optical disc apparatus of the present embodiment, it is possible to decode the ADIP of a wobble signal with higher stability while reducing the circuit size, reducing power consumption, and simplifying the adjusting process.

Third Embodiment

The second embodiment described the configuration in which ADIP is decoded based on the distribution of an address corresponding to a wobble clock count value where an ADC output value (the amplitude value of a digital signal) is minimized and based on the ADC output value (the amplitude value of the digital signal) corresponding to the address.

The present embodiment will describe another configuration for decoding ADIP based on the distribution of an address and an ADC output value (the amplitude value of a digital signal) corresponding to the address. The configuration of an optical disc apparatus is similar to that of the optical disc apparatus 100 shown in FIG. 1.

Figure 12:
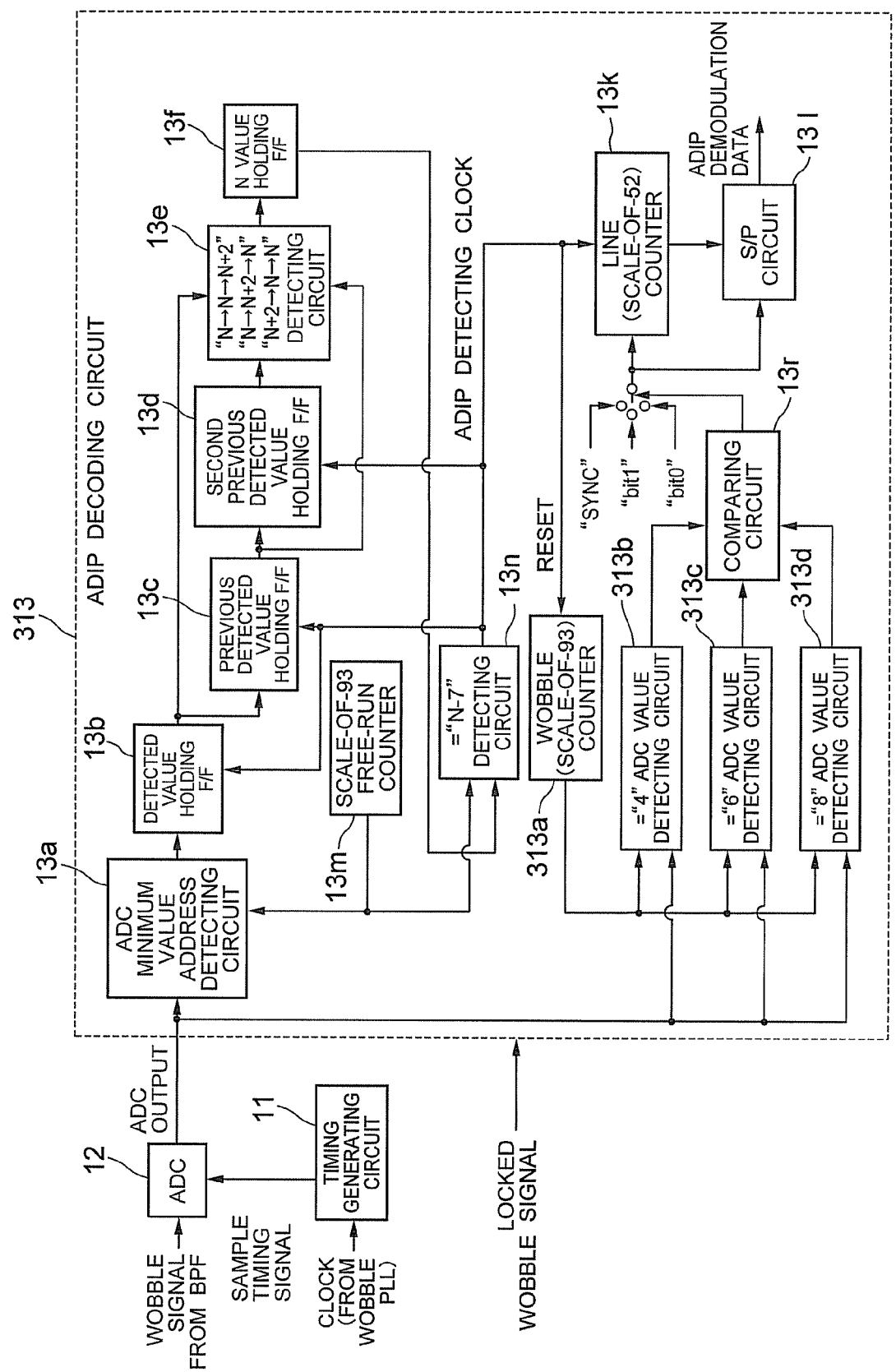
FIG. 12 shows a circuit configuration for decoding ADIP according to a third embodiment which is an aspect of the present invention, in a part indicated by a dotted line in FIG. 1.

FIG. 12 shows a circuit configuration for decoding ADIP according to a third embodiment which is an aspect of the present invention, in a part indicated by a dotted line in FIG. 1. The configurations indicated by the same reference numerals as the first and second embodiments are similar to those of the first and second embodiments. The ADIP decoding circuit 13 of FIG. 1 is replaced with an ADIP decoding circuit 313 in the present embodiment.

As shown in FIG. 12, an ADC 12 is fed with a wobble signal (the same signal as the signal inputted to a wobble PLL circuit 10) having been processed by a BPF 9.

A timing generating circuit 11 is fed with a clock having a higher frequency than a wobble synchronized with the wobble signal, from the VCO of the wobble PLL circuit 10. Then, the timing generating circuit 11 generates the sampling timing signal of the ADC 12 and outputs the signal to the ADIP decoding circuit 313. Further, the ADIP decoding circuit 313 is fed with a locked wobble signal from the wobble PLL circuit 10.

As shown in FIG. 12, the ADIP decoding circuit 313 includes a wobble (scale-of-93) counter 313a, a =="4" ADC value detecting circuit 313b, a =="6" ADC value detecting circuit 313c, and a =="8" ADC value detecting circuit 313d. The =="4" ADC value detecting circuit 313b corresponds to the =="N−2" ADC value detecting circuit 13o of FIG. 9 when an N value is 6. Further, the =="6" ADC value detecting circuit 313c corresponds to the =="N" ADC value detecting circuit 13p of FIG. 9 when the N value is 6. The =="8" ADC value detecting circuit 313d corresponds to the =="N+2" ADC value detecting circuit 13q of FIG. 9 when the N value is 6.

In the present embodiment, the basic decoding method is similar to that of the second embodiment and as described above, the wobble counter 313a is provided in addition to a free-run counter 13m.

The free-run counter 13m is used only for detecting the N value. In response to an ADIP detecting clock outputted from a "==N−7" detecting circuit 13n, the phase of the wobble counter 313a is adjusted such that the first wobble of a modulation region corresponds to an address value of "0" as shown in FIGS. 2 to 4.

In other words, the wobble counter 313a is reset by the ADIP detecting clock generated at "N−7" by the free-run counter 13m. Thus the address value of the wobble counter can be fixed to "4", "6" and "8" when ADC output values are compared with each other.

Figure 13:
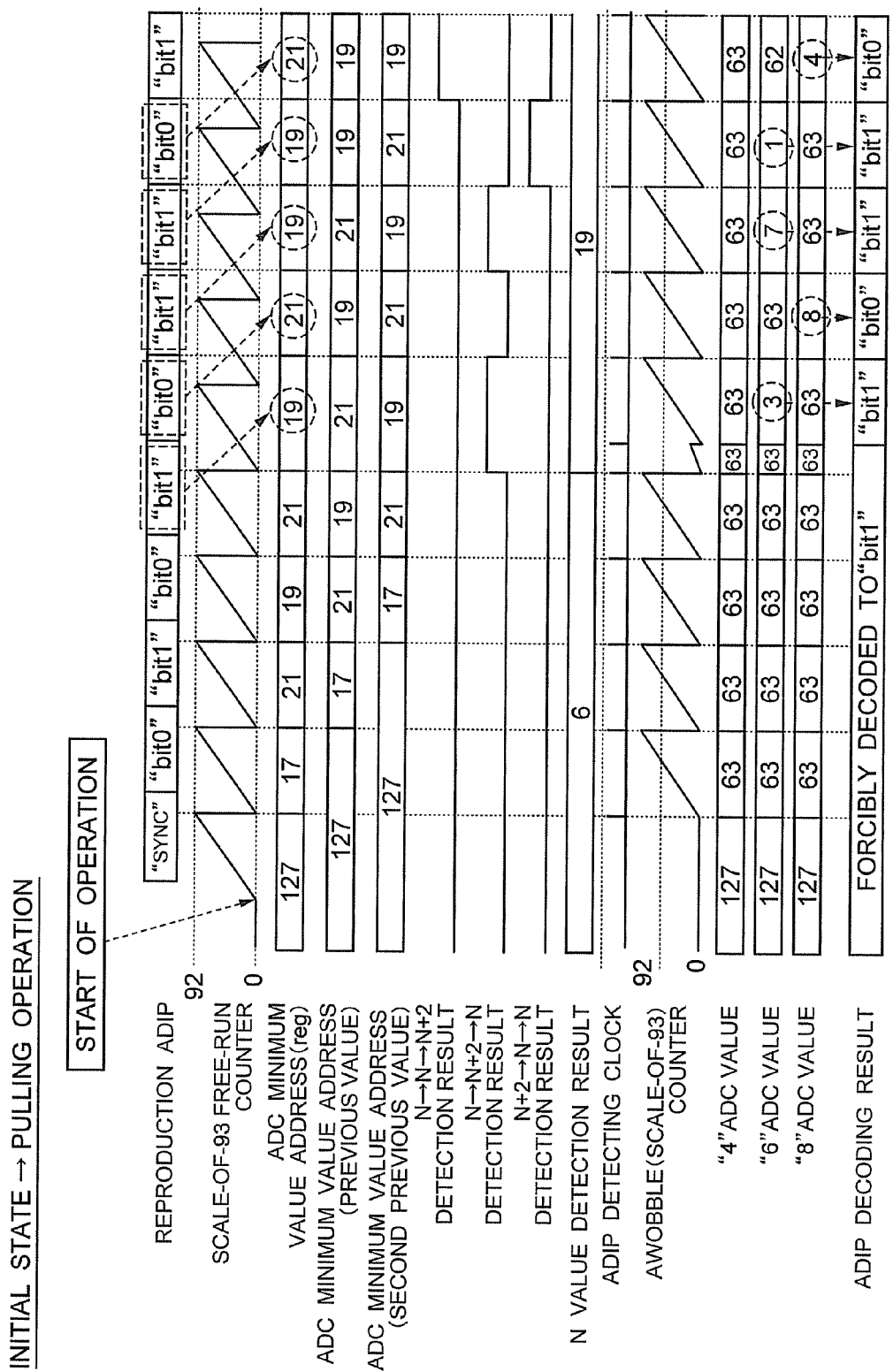
FIG. 13 is a timing chart showing the decoding results of the third embodiment.

FIG. 13 is a timing chart showing the decoding results of the third embodiment.

In the timing chart of FIG. 13, the N value changes from "6", the initial value, to "19". Accordingly, the position where the ADIP detecting clock is generated is changed from "92" of the free-run counter to "12". The wobble counter 313a is reset on this position and is in phase with the ADIP modulation region. Thereafter, ADC values detected by detecting circuits 313b to 313d at the wobble counter values of "4", "6" and "8" are compared by a comparing circuit 13r and ADIP is decoded according to the same decision method as the second embodiment.

Figure 14:
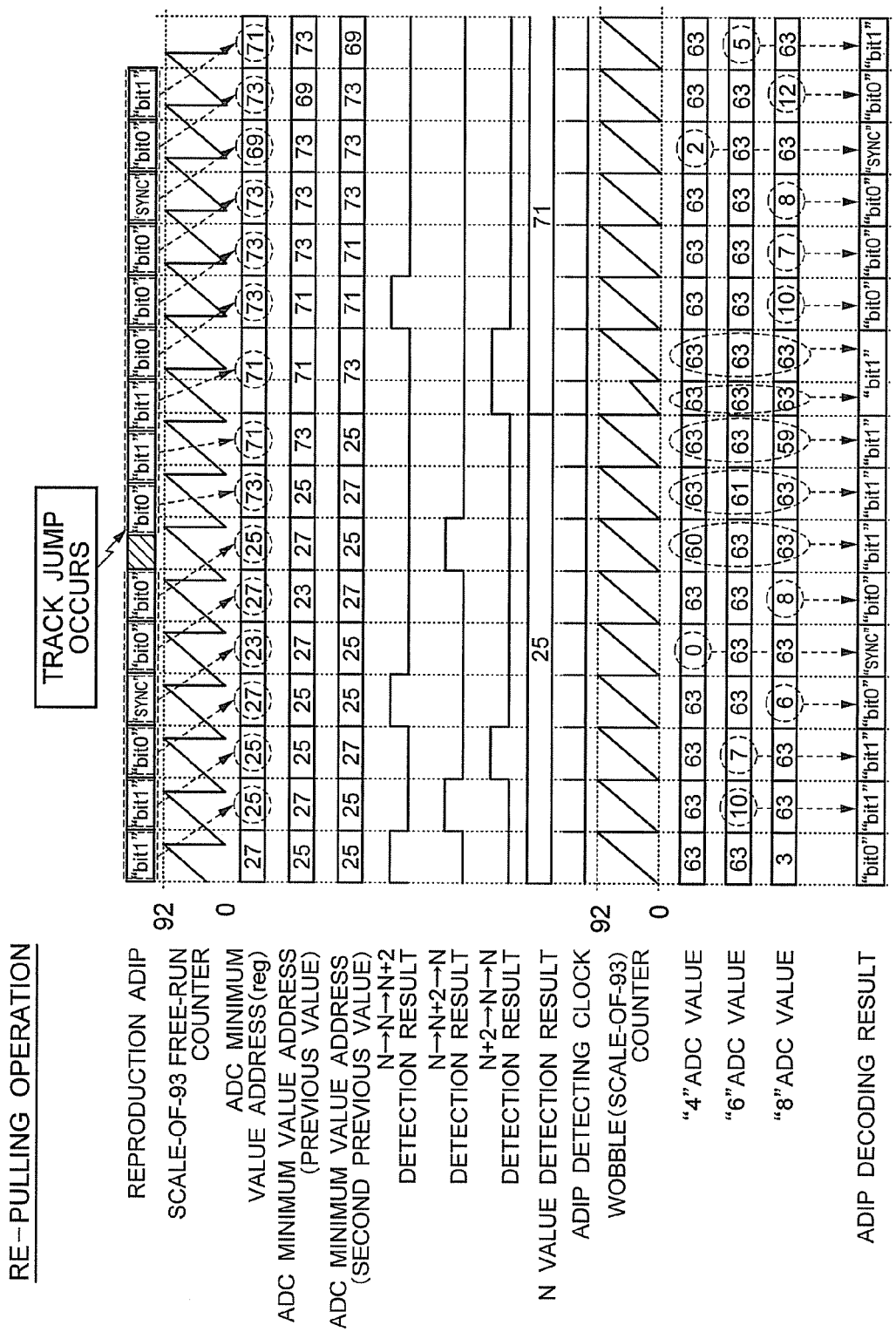
FIG. 14 is a timing chart showing a process in which a phase is shifted by the influence of a track jump and the like and then is pulled back in the present embodiment.

FIG. 14 is a timing chart showing a process in which a phase is shifted by the influence of a track jump and the like and then is pulled back in the present embodiment.

As shown in FIG. 14, the N value is "25" before the occurrence of a track jump and changes to "71" after the track jump occurs. After the track jump occurs, a waveform distortion caused by phase inversion is not located on "4", "6" and "8" of the wobble counter until the N value is determined. Thus the ADC output value indicates a high potential such as "63". In the case where the ADC value having been minimized by the protecting function exceeds a predetermined value such as "32", ADIP is forcibly decoded to a bit1 pattern and the like.

In this way, in the present embodiment, the basic decoding method is not different from that of the second embodiment and the same effect is achieved. Although the circuit size is increased by the wobble counter, the address values for comparison can be advantageously fixed.

As described above, according to the optical disc apparatus of the present embodiment, it is possible to decode the ADIP of a wobble signal with higher stability while reducing the circuit size, reducing power consumption, and simplifying the adjusting process.

Fourth Embodiment

The third embodiment described the configuration for resetting the wobble counter in response to the ADIP detecting clock.

The present embodiment will describe a configuration for achieving an ADIP decoding method for protecting the resetting operation from disturbance such as noise with a faster pulling operation than the first to third embodiments. The configuration of an optical disc is similar to that of the optical disc apparatus 100 shown in FIG. 1.

Figure 15:
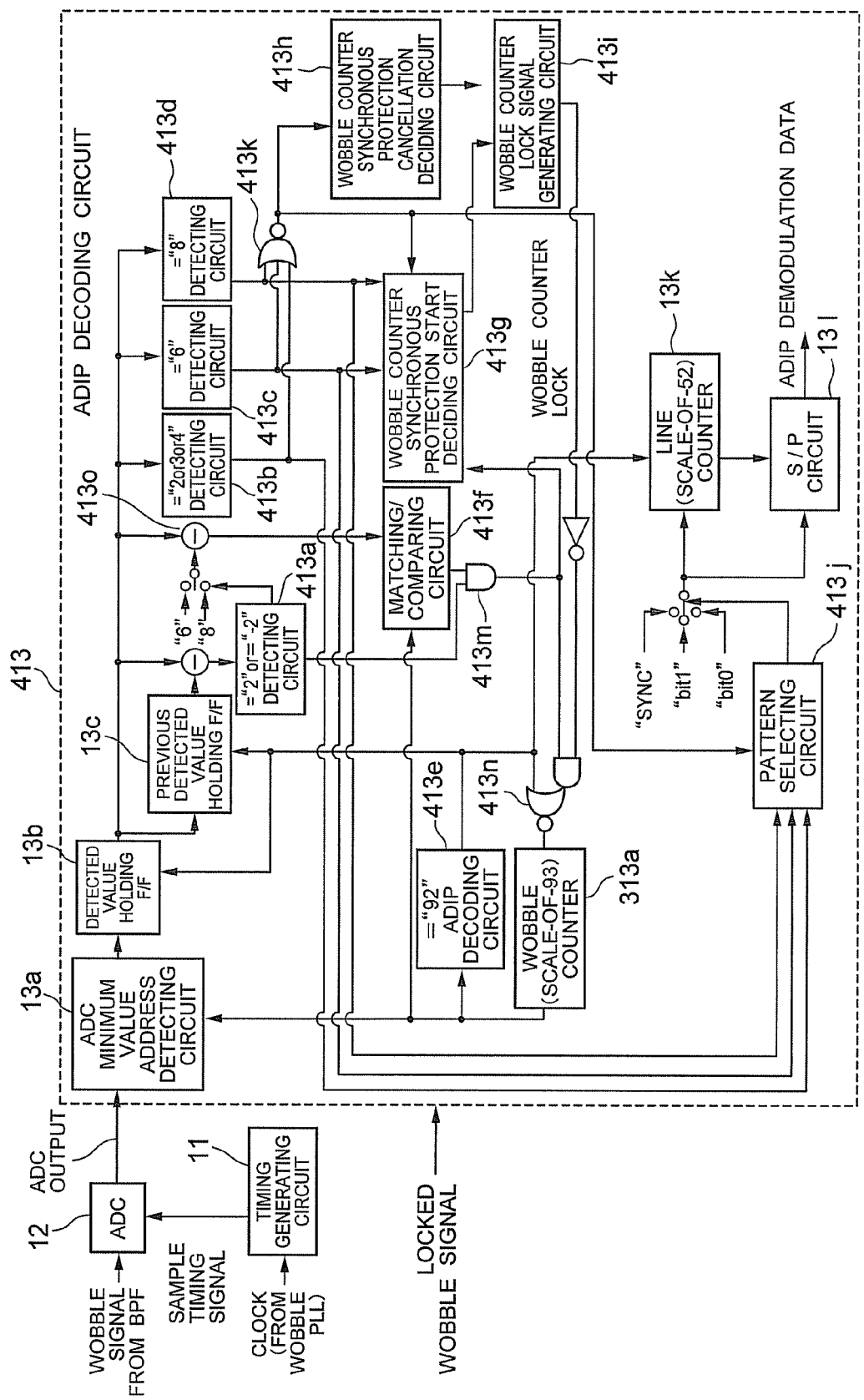
FIG. 15 shows a circuit configuration for decoding ADIP according to a fourth embodiment which is an aspect of the present invention, in a part indicated by a dotted line in FIG. 1.

FIG. 15 shows a circuit configuration for decoding ADIP according to a fourth embodiment which is an aspect of the present invention, in a part indicated by a dotted line in FIG. 1. The configurations indicated by the same reference numerals as the first to third embodiments are similar to those of the first to third embodiments. The ADIP decoding circuit 13 of FIG. 1 is replaced with an ADIP decoding circuit 413 in the present embodiment.

In the present embodiment, unlike the first to third embodiments, it is detected that ADC minimum value addresses measured in two consecutive periods are "N" and "N+2" (not in particular order) and then an N value is determined. Therefore, the present embodiment is characterized by a fast pulling process. Regarding a process in which a wobble (scale-of-93) counter 313a starts counting from the initial state in response to a command and the like of a microcomputer and an address having the minimum ADC output is detected in each period, the present embodiment is similar to the first to third embodiments.

In FIG. 15, a =="2" or =="−2" detecting circuit 413a detects that a difference value between minimum value addresses having been measured in two consecutive periods is "2" or "−2".

Figure 16:
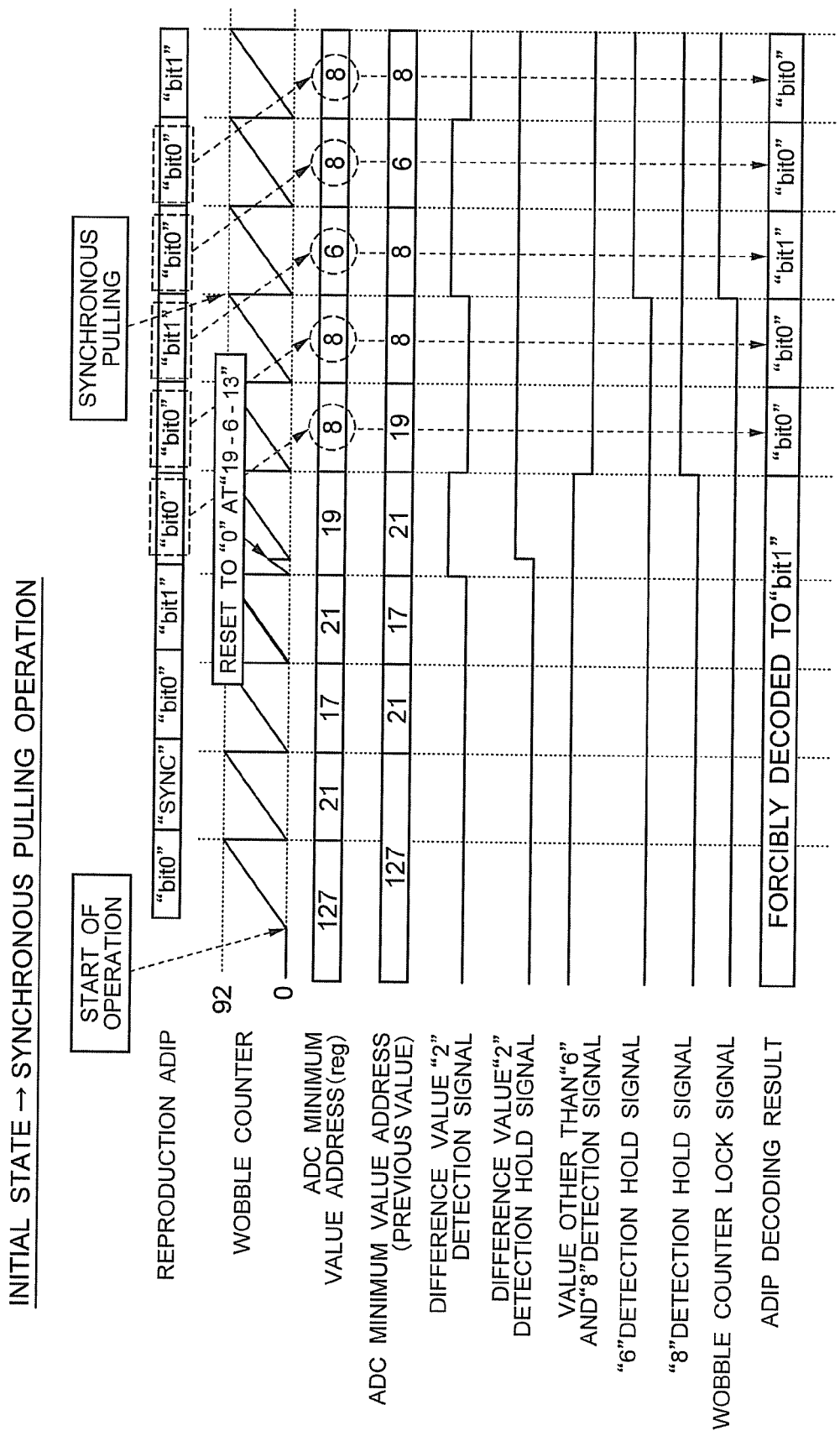
FIG. 16 is a timing chart showing the decoding results during synchronous pulling of the fourth embodiment.

FIG. 16 is a timing chart showing the decoding results during synchronous pulling of the fourth embodiment.

As shown in FIG. 16, when the minimum value address changes from "21" to "19", the =="2" or =="−2" detecting circuit 413a detects a difference value of "2" and outputs a difference value "2" detection signal.

As shown in FIG. 15, the detection result of the =="2" or =="−2" detecting circuit 413a is inputted to a subtracting circuit 413o. In response to the input result, the subtracting circuit 413o selects "6" or "8" based on the ADC minimum value address ("19" in the timing chart of FIG. 16) and performs a subtraction.

The =="2" or =="−2" detecting circuit 413a selects "6" when the difference is "2", and selects "8" when the difference is "−2". The subtraction result is inputted to a matching/comparing circuit 413f in which the subtraction result is matched and compared with a wobble counter value outputted from a wobble counter 313a. The matching/comparison result is inputted with the difference value "2" or "−2" detection result to an AND circuit 413m. Then, the output result of the AND circuit 413m is inputted to a composite gate ANR1 circuit 413n for generating the reset signal of the wobble counter 313a and to a wobble counter synchronous protection start deciding circuit 413g.

The wobble counter synchronous protection start deciding circuit 413g outputs a synchronous protection start signal to a wobble counter lock signal generating circuit based on the output of a =="6" detecting circuit 413c ("6" detection hold signal), the output of a =="8" detecting circuit 413d ("8" detection hold signal), the output of a NOR circuit 413k (value other than "6" and "8" detection signal), and the output of the AND circuit 413m. In other words, the wobble counter synchronous protection start deciding circuit 413g outputs a signal for inhibiting resetting of the wobble counter (synchronous protection start) based on the distribution of an address corresponding to the count value of a wobble clock. The amplitude value of a digital signal is minimized at the count value.

In response to the synchronous protection start signal, a wobble counter lock signal generating circuit 413*i* outputs a wobble counter lock signal "H".

Further, based on the value other than "6" and "8" detection signal outputted from the NOR circuit 413*k*, a wobble counter synchronous protection cancellation deciding circuit 413*h* outputs a synchronous protection cancellation signal to the wobble counter lock signal generating circuit 413*i*. In other words, the wobble counter synchronous protection cancellation deciding circuit 413*h* outputs a signal enabling resetting of the wobble counter (synchronous protection cancellation), based on the distribution of an address corresponding to the counter value of the wobble clock. A digital signal has the minimum amplitude value at the count value.

In response to the synchronous protection cancellation signal, the wobble counter lock signal generating circuit 413*i* outputs a wobble counter lock signal "L".

The ANR1 circuit 413*n* generates a reset signal with negative logic based on one of the AND condition of the wobble counter lock signal and the AND output signal and the carry of the wobble counter 313*a* (the active result of a =="92" detecting circuit 413*e*).

In other words, in addition to the carry of the wobble counter 313*a*, in the case where the wobble counter lock signal is "L" (active) and ADC output results have a difference of 121 in two consecutive periods, the wobble counter 313*a* is reset at a moment when the matching/comparison result becomes active.

The wobble counter lock signal is "L" in the initial state (will be described later). The wobble counter 313*a* is reset because, as discussed in the third embodiment, a counter value detected as a decision condition upon pattern selection can be fixed (to a value such as "6" and "8").

The wobble counter 313*a* is reset on the condition that the ADC minimum value address changes from "N+2" to "N", that is, a difference value is "2". In this case, it is decided that bit0 has changed to bit1 and the wobble counter 313*a* is reset at the counter value of N-6.

When the ADC minimum value address changes from "N" to "N+2", that is, a difference value is "-2", it is decided that bit1 has changed to bit0 and the wobble counter 313*a* is reset to "0" at the counter value of N-8. Thus the phase of the counter is adjusted to the phases of FIGS. 2 to 4.

Figure 17:
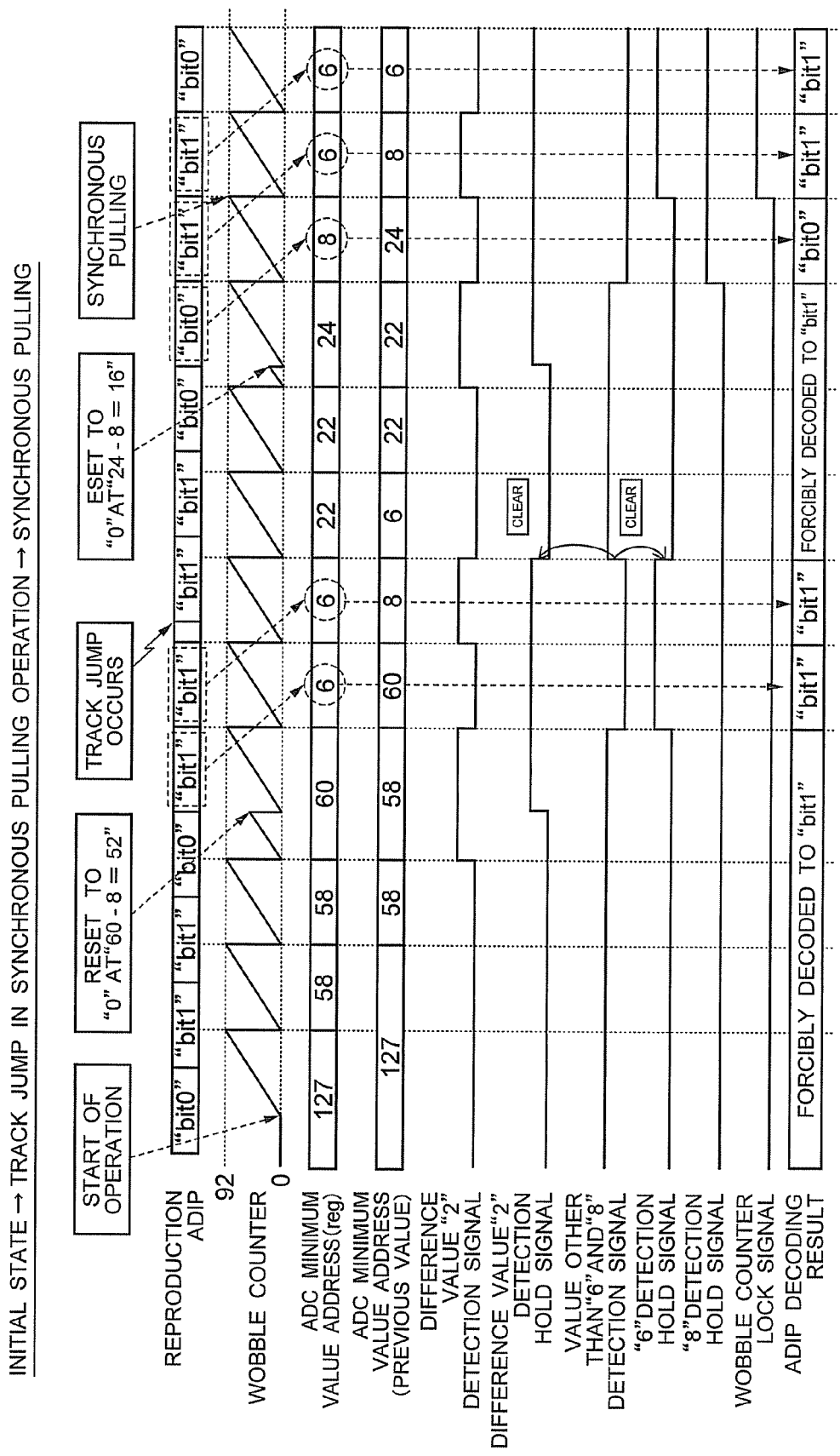
FIG. 17 is a timing chart showing that the phase relationship between the counter and an ADIP position is changed by the influence of a track jump and the like in the synchronous pulling process and then pulling is performed again.

In the timing chart of FIG. 17, in response to a change of the ADC minimum value address from "21" to "19", the counter value is reset to "0" when reaching "19-6=3".

With these steps, the phase of the free-run wobble counter 313*a* in the initial state can be adjusted to an ADIP phase only by detecting the ADC minimum value addresses in two consecutive periods.

The ADIP detecting method after the counter phase adjustment is similar to that of the first embodiment. When the ADC minimum value address is "2, 3 or 4", the output of a detected value holding F/F 13*b* is detected by a =="2 or 3 or 4" detecting circuit 413*b*, and a pattern selecting circuit 413*j* selects a sync pattern in response to the detection result. When the ADC minimum value address is "6", the output of the detected value holding F/F 13*b* is detected by a =="6" detecting circuit 413*c*, and the pattern selecting circuit 413*j* selects a bit1 pattern in response to the detection result. When the ADC minimum value address is "8", the output of the detected value holding F/F 13*b* is detected by a =="8" detecting circuit 413*d*, and the pattern selecting circuit 413*j* selects a bit0 pattern in response to the detection result.

When "6" is not detected and the ADC minimum value address is not any one of "2 or 3 or 4" and "8", the pattern selecting circuit 413*j* may select the bit1 pattern.

The following will discuss synchronous protection required in the present embodiment.

As shown in FIG. 16, when the wobble counter 313*a* is reset in response to the difference value "2" detection signal from the =="2" or =="-2" detecting circuit 413*a*, the difference value "2" detection hold signal generated in the wobble counter synchronous protection start deciding circuit 413*g* is set to "H". When the ADC minimum value address is "6", the "6" detection hold signal outputted from the =="6" detecting circuit 413*c* is set to H. Further, when the ADC minimum value address is "8", the "8" detection hold signal outputted from the =="8" detecting circuit 413*d* is set to H.

These three hold signals, after being set to "H", remain "H" until the wobble counter lock signal changes from "H" to "L" or until the value other than "6" and "8" detection signal changes from "L" to "H".

The wobble counter 313*a* is reset to "0" when the carry of the wobble counter 313*a* is generated at the counter value of 92 or when the AND circuit 413*m* generates a reset signal with the wobble counter lock signal set to "L". In other words, when the wobble counter lock signal is set to "H", the reset signal outputted from the AND circuit 413*m* becomes invalid and synchronous protection is performed.

As shown in FIG. 16, when the ADC minimum value address changes from "21" to "19" and the counter is reset, the difference value "2" detection hold signal is set to "H". Next, when the ADC minimum value address is "8", the "8" detection hold signal is set to "H". When the ADC minimum value address is "6", the "6" detection hold signal is set to "H". When the "6" detection hold signal is set to "H", three conditions are satisfied, the wobble counter lock signal is set to "H", and synchronous pulling is performed.

In this way, the ADIP decoding circuit 413 temporarily inhibits resetting based on the distribution of addresses in a plurality of counter periods corresponding to the count values of the wobble clock. The amplitude value of a digital signal is minimized at the count values.

The following will describe behaviors when the phase relationship between the counter and an ADIP position is changed by the influence of a track jump and the like in a synchronous pulling process and then pulling is performed again according to the present embodiment.

FIG. 17 is a timing chart showing that the phase relationship between the counter and an ADIP position is changed by the influence of a track jump and the like in the synchronous pulling process and then pulling is performed again.

When the ADC minimum value address changes from "58" to "60", a difference value of "2" is detected, the phase of the counter is adjusted, and the difference value "2" detection hold signal is set to "H". Thereafter, the bit1 pattern is consecutively generated twice and the ADC minimum value address is consecutively set to "6" twice. At the first detection of "6", the "6" detection hold signal is set to "H".

At this point, the "8" detection hold signal is still "L" and the three conditions are not satisfied. Thus the wobble counter lock signal remains "L".

Next, a track jump occurs, the counter and ADIP are out of phase with each other, and the ADC minimum value address of "22" is detected which cannot be normally generated in a normal phase. At this point, the value other than "6" and "8" detection signal changes from "L" to "H" and the difference value "2" detection hold signal and the "6" detection hold signal are cleared from "H" to "L" in response to the change of the value other than "6" and "8" detection signal.

Next, when the ADC minimum value address changes from "22" to "24", the difference value "2" detection hold signal is set to "H" again and then the counter is reset.

Then, when the bit0 pattern is replaced with the bit1 pattern, the ADC minimum value address changes from "8" to "6", so that the three conditions are satisfied, the wobble counter lock signal is set to "H", and synchronous pulling is performed.

Although the N value is detected based on the difference value of 2 in the present embodiment, the N value is basically detected from the combination of the bit0 pattern and the bit 1 pattern.

However, as described above, the difference value may be set to "2" by the combination of the sync pattern and the bit1 pattern. The sync pattern is, as described above, generated only once out of 52 times. Thus the probability that the combination occurs in the pulling process is not high.

Figure 18:
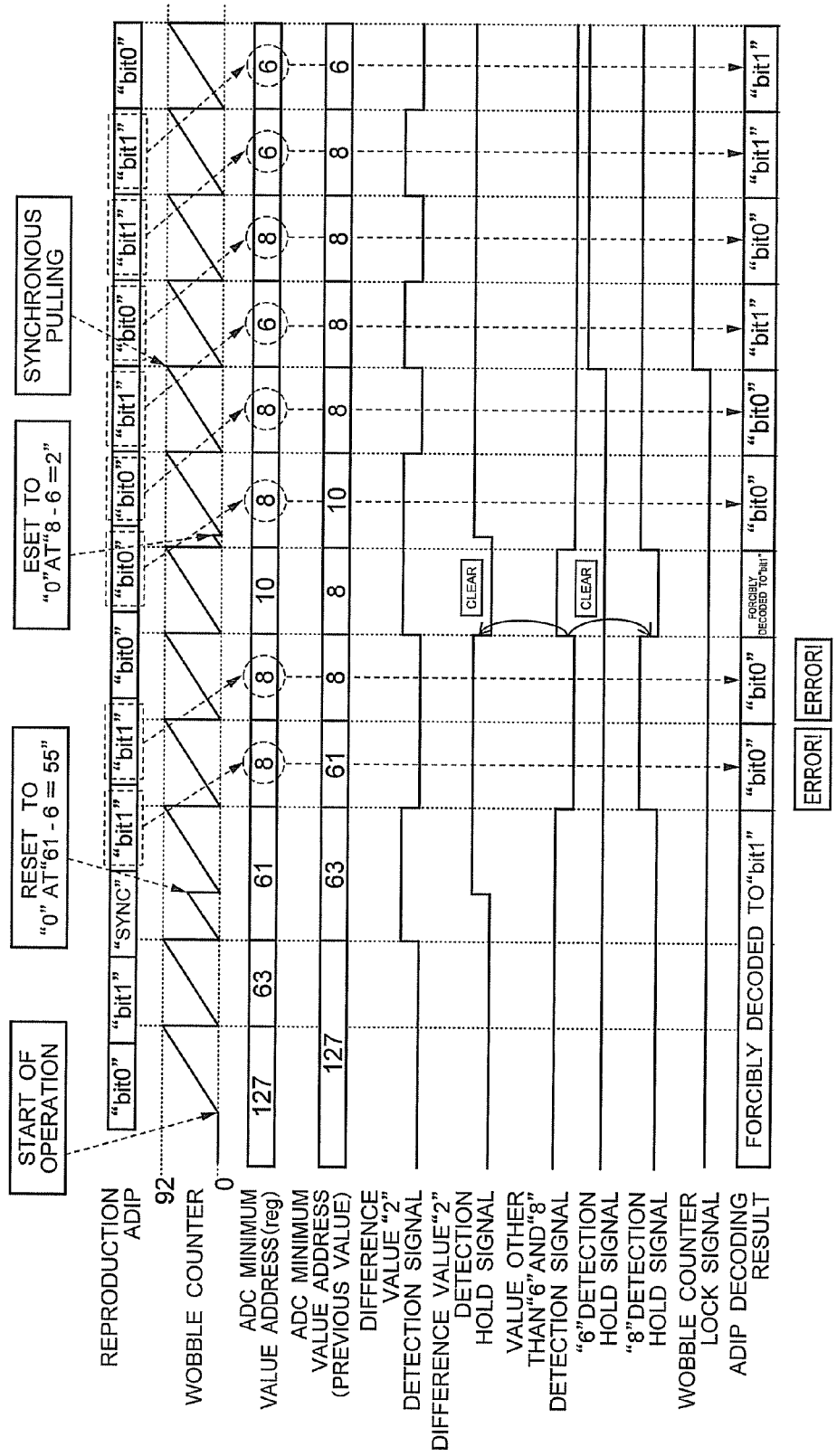
FIG. 18 is a timing chart showing that synchronous pulling is performed after passage through the sync pattern in the synchronous pulling process.

In this case, like the operations of a timing chart shown in FIG. 18, synchronous pulling is performed after passage through the sync pattern in the synchronous pulling process.

In this example, passage is performed from the bit1 pattern to the sync pattern in the pulling process. In this case, the ADC minimum value address changes from "63" to "61". Thus it is decided that "61" is the ADC minimum value position of the bit1 pattern and the counter is reset at "61−6=55" to adjust the phase.

After that, the ADC minimum value address is set to "8" and the "8" detection hold signal is set to "H".

In reality, however, the position of "61" is not the ADC minimum value position of the bit1 pattern but is the ADC minimum value position of the sync pattern. Thereafter, when the bit0 pattern is detected, the address supposed to be "8" becomes "10" in a right phase. Thus the value other than "6" and "8" detection signal rises from "L" to "H", it is found that the phase is not correct, and the signal is cleared before the completion of the pulling operation.

After that, pulling is performed again in response to a change from the bit1 pattern to the bit0 pattern. The counter is gradually brought to a wrong phase by the influence of the sync pattern in the pulling process.

However, the three pulling conditions make it possible to recognize the wrong phase before the pulling process, thereby preventing erroneous locking, though some steps are necessary.

With this feature, the ADIP detection pattern may be forcibly set to the bit1 pattern in a period during which the wobble counter lock signal is "L", which is not shown in the timing chart of FIG. 18.

The following will discuss operations when synchronism is lost by the influence of a track jump and the like after synchronous pulling is performed according to the present embodiment.

Figure 19:
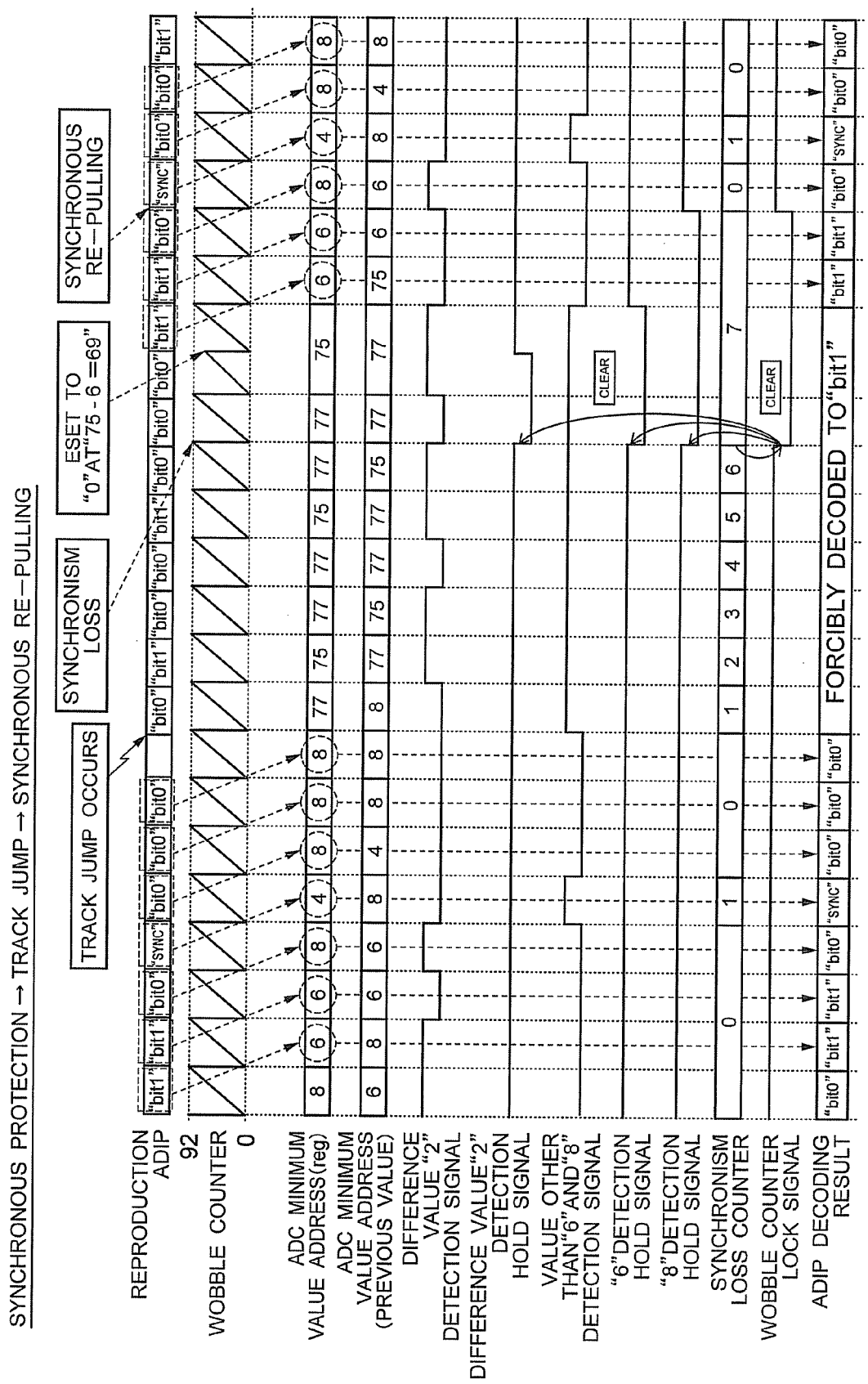
FIG. 19 is a timing chart showing the operations when synchronism is lost by the influence of a track jump and the like after synchronous pulling is performed.

FIG. 19 is a timing chart showing the operations when synchronism is lost by the influence of a track jump and the like after synchronous pulling is performed.

The present embodiment will describe the case where synchronism is lost on the condition that a value other than "6" and "8" is detected for the seventh consecutive time. A value other than "6" and "8", as described above, can have a value of "2" to "4" in the sync pattern and thus is steadily generated at least once. Therefore, synchronism should be lost on the condition that a value other than "6" and "8" is detected at least twice. Further, considering the case where a value other than "6" and "8" is generated by the influence of disturbance and the like, the conditions of loss of synchronism should be systematically determined according to the pulling time.

In the example of FIG. 19, the ADC minimum value address is "4" in the first half, the value other than "6" and "8" detection signal changes from "L" to "H". In response to this change, a synchronism loss counter having an initial value of "0" is set to "1". However, when the ADC minimum value address changes to "8" and the value other than "6" and "8" detection signal changes from "H" to "L", the counter is reset to Since it is decided through this operation that the counter and the ADIP position are in phase with each other, synchronous protection is performed.

Next, a track jump occurs, the ADC minimum value address changes from "77" to "75", . . . and the counter continues counting up from "1" to "2" . . . . When the counter counts up to "7", the conditions of loss of synchronism are satisfied and thus the wobble counter lock signal is cleared to "L". In response to the change of the wobble counter lock signal from "H" to "L", the difference value "2" hold signal, the "6" detection hold signal, and the "8" detection hold signal are all cleared to "L".

At this point, pulling is performed again. A change from "77" to "75" is detected, the phase of the counter is adjusted, a change from "6" to "8" is detected, and then pulling is performed again.

As described above, in the present embodiment, the method of two consecutive detections can achieve faster pulling than the first to third embodiments.

Further, the concept of synchronous protection makes it possible to positively detect the N value without being affected by the sync pattern, though the configuration slightly becomes complicated. Thus stable ADIP decoding can be achieved with resistance to disturbance occurring after pulling is performed.

Moreover, as in the third embodiment, the address value used for deciding ADIP decoding can be fixed and this configuration only requires the single wobble counter.

Fifth Embodiment

The fourth embodiment described the configuration for protecting a resetting operation from disturbance such as noise.

The present embodiment will describe another configuration for protecting the resetting operation from disturbance such as noise. The configuration of an optical disc is similar to that of the optical disc apparatus 100 shown in FIG. 1.

Figure 20:
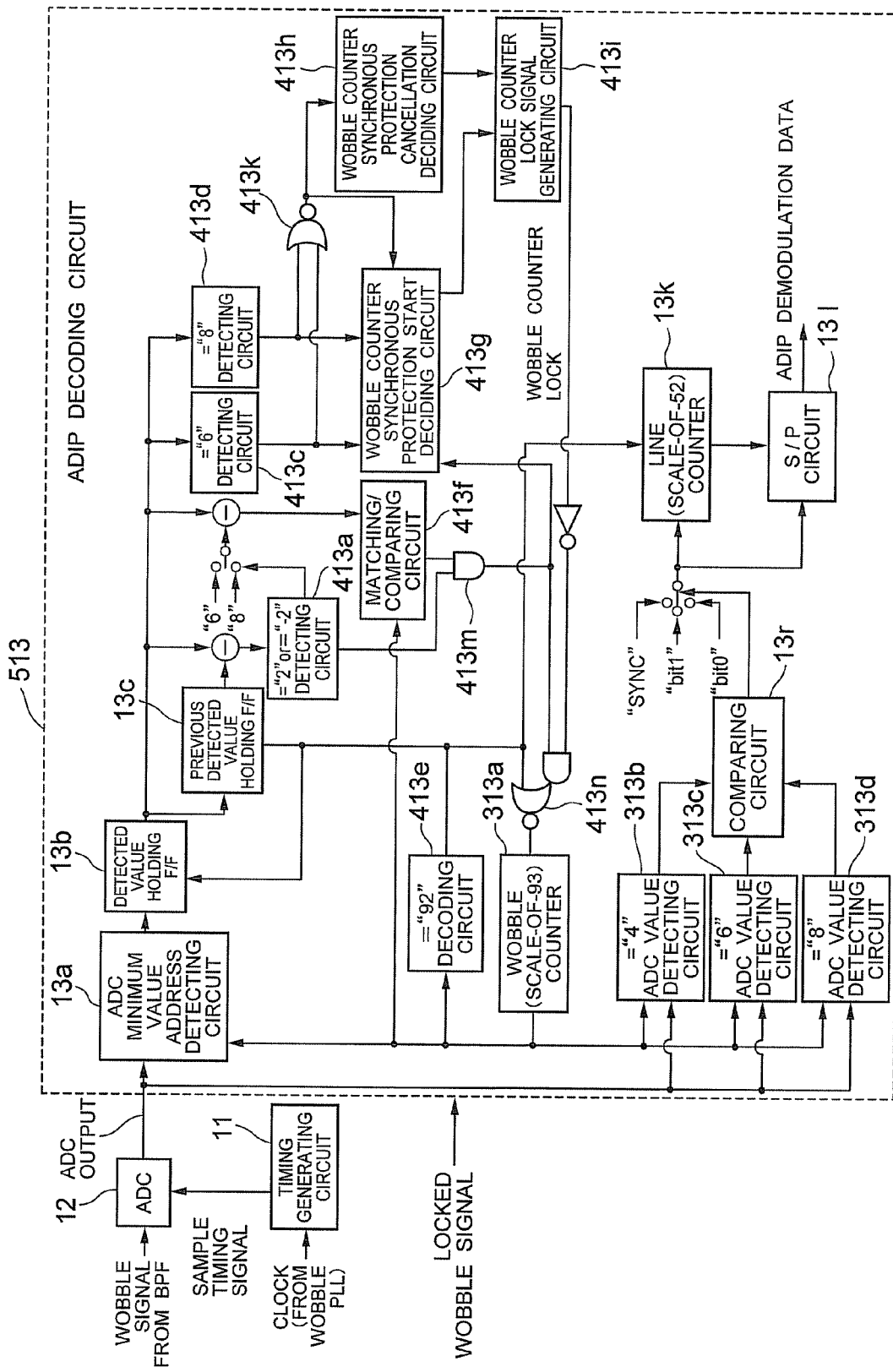
FIG. 20 shows a circuit configuration for decoding ADIP according to a fifth embodiment which is an aspect of the present invention, in a part indicated by a dotted line in FIG. 1.

FIG. 20 shows a circuit configuration for decoding ADIP according to a fifth embodiment which is an aspect of the present invention, in a part indicated by a dotted line in FIG. 1. The configurations indicated by the same reference numerals as the first to fourth embodiments are similar to those of the first to fourth embodiments. The ADIP decoding circuit 13 of FIG. 1 is replaced with an ADIP decoding circuit 513 in the present embodiment.

In the present embodiment, as in the fourth embodiment, N values are detected in consecutive wobble counter periods, the phase of a wobble counter is adjusted, and the concept of synchronous protection is used.

The fourth and fifth embodiments are different between absolute comparison and relative comparison that have been described in the explanation of the difference between the first and second embodiments.

Figure 21:
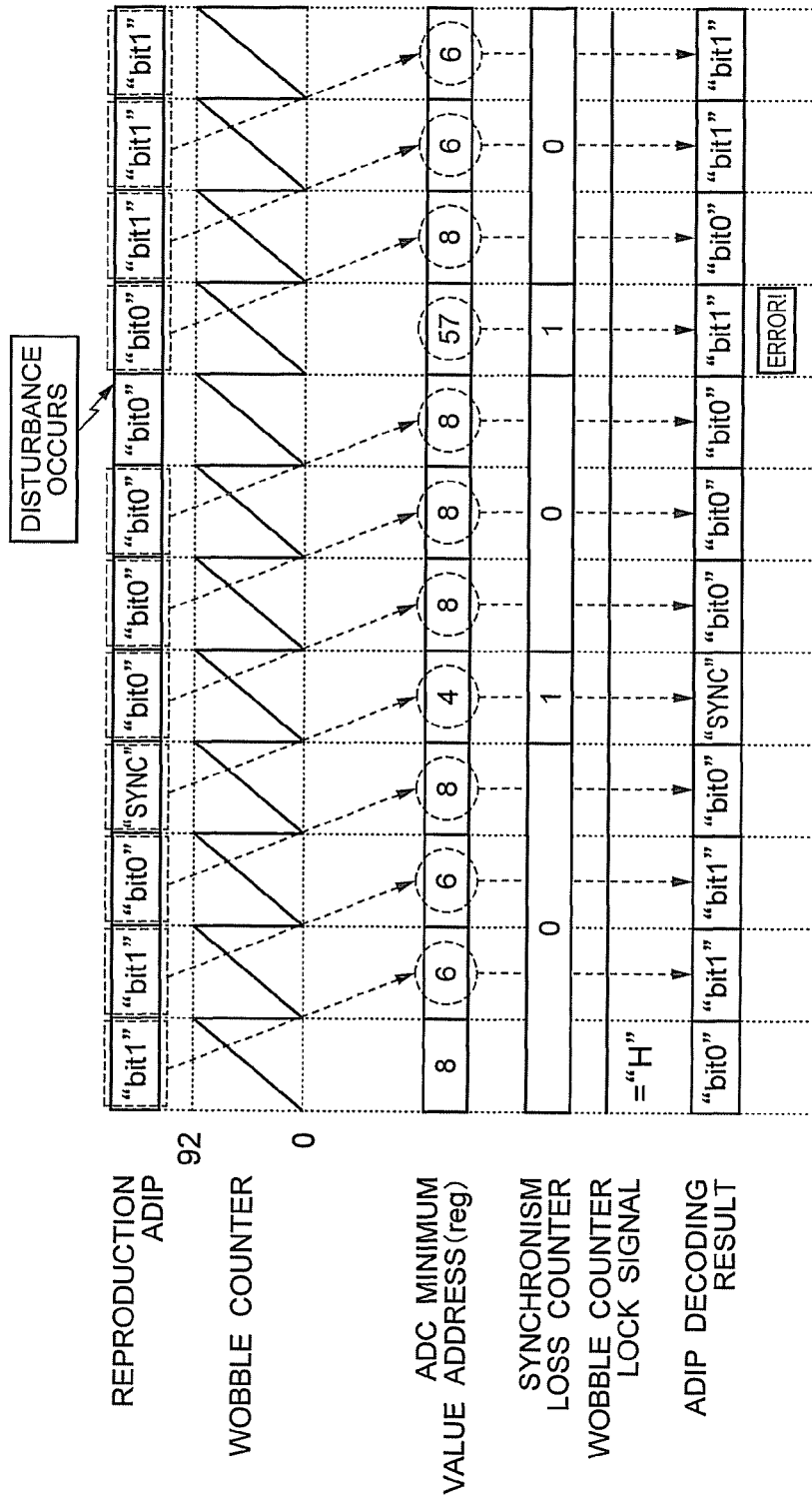
FIG. 21 is a timing chart showing the decoding results of the fourth embodiment in the event of disturbance such as a scratch in a synchronous protection state.
Figure 22:
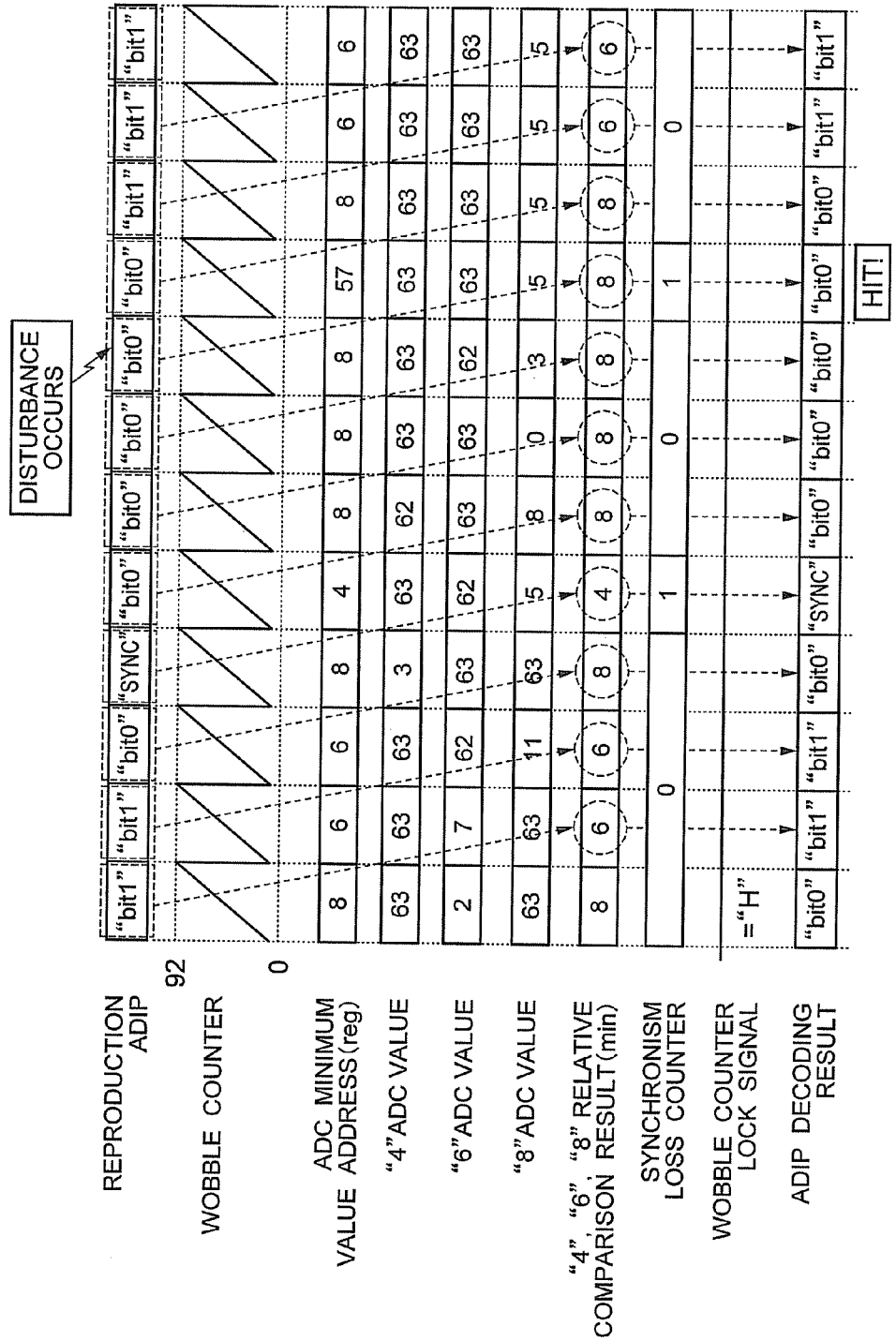
FIG. 22 is a timing chart showing the decoding results of the fifth embodiment in the event of disturbance such as a scratch in the synchronous protection state.

FIG. 21 is a timing chart showing the decoding results of the fourth embodiment in the event of disturbance such as a scratch in a synchronous protection state. FIG. 22 is a timing chart showing the decoding results of the fifth embodiment in the event of disturbance such as a scratch in the synchronous protection state.

As shown in FIG. 21, in the fourth embodiment, an ADIP pattern is selected based on a detected ADC minimum value address. In the present embodiment, as shown in FIG. 22, an ADIP pattern is decided by relatively comparing (detecting the minimum value) ADC output values obtained when a wobble counter value is "4", "6" and "8", as in the second and third embodiments. Thus in the present embodiment, more stable decoding can be achieved with higher resistance to disturbance.

As described above, the optical disc apparatus of the present embodiment can further stabilize ADIP decoding while simplifying the circuit configuration.

The influence of a phase-inverted part on the output of a BPF varies because the group delay characteristics and phase characteristics are changed by the degree or Q of the BPF.

In this case, variations in the influence of the phase-inverted part can be handled by partially changing the specific detecting method according to the characteristics so as to positively identify ADIP. For example, the ADC sampling phase is changed, the ADC maximum value is detected by comparison instead of the ADC minimum value, and the ADIP pattern identification point is shifted from "6", "8" and so on to "5" and "7".

Moreover, in order to stabilize a wobble frequency in a non-phase inverted part, AGCs are used in the embodiments. However, the probability that a wobble waveform in the non-phase inverted part falls below the center potential at a sampling point is quite low unless disturbance such as a defect occurs. Thus for simplicity, AGCs may be omitted from the configurations.

Further, in order to clarify the sampling point of the non-phase inverted part, a gain amplifier may be provided between the BPF and the ADC.

By providing another means for adjusting the center frequency of the band-pass filter to always correct a deviation of the center frequency, a distorted point of a waveform is further stabilized and decoding can be achieved with higher accuracy.

The embodiments are configured by hardware and may be configured by the following method: when the N value is set based on the ADC minimum value address, the minimum value address in each wobble counter period is decided by a microcomputer and the N value is decided and set in hardware by the microcomputer.

What is claimed is:

1. An ADIP decoder for decoding address in pre-groove (ADIP) of a wobble of an optical disc, comprising:
    a band pass filter that filters a wobble signal having a period corresponding to the wobble;
    a wobble PLL circuit that divides a frequency of a phase-locked clock signal in response to an input of the filtered wobble signal, and outputs a locked wobble signal;
    a timing generating circuit that generates a sampling timing signal based on the clock signal;
    an analog to digital converter that converts the filtered wobble signal into a digital signal in synchronization with the sampling timing signal; and
    an ADIP decoding circuit that counts a clock of the locked wobble signal with a counter, holds an address and one of a minimum amplitude value and a maximum amplitude value of the digital signal for each counter period, the address corresponding to a wobble clock count value where the digital signal has one of the minimum amplitude value and the maximum amplitude value, and that decodes the ADIP based on a distribution of the held address.

2. The ADIP decoder according to claim 1, wherein the ADIP decoding circuit decodes the ADIP based on the distribution of the address and an amplitude value of the digital signal, the amplitude value corresponding to the address.

3. The ADIP decoder according to claim 1, wherein the ADIP decoding circuit resets a count of the counter based on the distribution of the address.

4. The ADIP decoder according to claim 3, wherein the ADIP decoding circuit temporarily inhibits the resetting based on the distribution of addresses in a plurality of counter periods.

5. The ADIP decoder according to claim 1, wherein the optical disc is a DVD+R disc.

6. The ADIP decoder according to claim 1, wherein the optical disc is a DVD+RW disc.

7. An optical disc apparatus for decoding address in pre-groove (ADIP) of a wobble of an optical disc, comprising:
    a band pass filter that filters a wobble signal having a period corresponding to the wobble;
    a wobble PLL circuit that divides a frequency of a phase-locked clock signal in response to an input of the filtered wobble signal, and outputs a locked wobble signal;
    a timing generating circuit that generates a sampling timing signal based on the clock signal;
    an analog to digital converter that converts the filtered wobble signal into a digital signal in synchronization with the sampling timing signal; and
    an ADIP decoding circuit that counts a clock of the locked wobble signal with a counter, holds an address and one of a minimum amplitude value and a maximum amplitude value of the digital signal for each counter period, the address corresponding to a wobble clock count value where the digital signal has one of the minimum amplitude value and the maximum amplitude value, and that decodes the ADIP based on a distribution of the held address.

8. The optical disc apparatus according to claim 7, wherein the ADIP decoding circuit decodes the ADIP based on the distribution of the address and an amplitude value of the digital signal, the amplitude value corresponding to the address.

9. The optical disc apparatus according to claim 7, wherein the ADIP decoding circuit resets a count of the counter based on the distribution of the address.

10. The optical disc apparatus according to claim 9, wherein the ADIP decoding circuit temporarily inhibits the resetting based on the distribution of addresses in a plurality of counter periods.

11. The optical disc apparatus according to claim 7, wherein the optical disc is a DVD+R disc.

12. The optical disc apparatus according to claim 7, wherein the optical disc is a DVD+RW disc.

* * * * *